United States Patent
Doufas et al.

(10) Patent No.: US 10,618,989 B2
(45) Date of Patent: Apr. 14, 2020

(54) POLYETHYLENE COMPOSITION

(71) Applicant: ExxonMobil Chemical Patents Inc., Baytown, TX (US)

(72) Inventors: Antonios K. Doufas, Houston, TX (US); David F. Sanders, Beaumont, TX (US); Matthew W. Holtcamp, Huffman, TX (US); Xuan Ye, Houston, TX (US); Alexander I. Norman, Houston, TX (US); Rohan A. Hule, Houston, TX (US); Hasnain Rangwalla, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/564,387

(22) PCT Filed: Apr. 19, 2016

(86) PCT No.: PCT/US2016/028271
§ 371 (c)(1),
(2) Date: Oct. 4, 2017

(87) PCT Pub. No.: WO2016/172099
PCT Pub. Date: Oct. 27, 2016

(65) Prior Publication Data
US 2018/0134828 A1 May 17, 2018

Related U.S. Application Data

(63) Continuation-in-part of application No. PCT/US2016/021748, filed on Mar. 10, 2016.

(60) Provisional application No. 62/149,799, filed on Apr. 20, 2015.

(51) Int. Cl.
| | |
|---|---|
| *C08F 4/64* | (2006.01) |
| *C08F 210/16* | (2006.01) |
| *C08F 4/6592* | (2006.01) |
| *B01J 31/22* | (2006.01) |
| *C08F 110/02* | (2006.01) |
| *C08F 4/659* | (2006.01) |

(52) U.S. Cl.
CPC ......... *C08F 210/16* (2013.01); *B01J 31/2295* (2013.01); *C08F 4/6592* (2013.01); *C08F 4/65912* (2013.01); *C08F 4/65916* (2013.01); *C08F 4/65927* (2013.01); *C08F 110/02* (2013.01); *C08F 2420/02* (2013.01); *C08F 2500/04* (2013.01); *C08F 2800/10* (2013.01)

(58) Field of Classification Search
CPC ............. C08F 210/16; C08F 4/64; C08F 4/76
See application file for complete search history.

(56) References Cited

U.S. PATENT DOCUMENTS

| | | |
|---|---|---|
| 4,701,432 A | 10/1987 | Wellborn, Jr. |
| 5,077,255 A | 12/1991 | Wellborn, Jr. |
| 5,135,523 A | 8/1992 | Magruder et al. |
| 5,382,630 A | 1/1995 | Stehling et al. |
| 5,382,631 A | 1/1995 | Stehling et al. |
| 5,516,848 A | 5/1996 | Canich et al. |
| 6,069,213 A | 5/2000 | Nemzek et al. |
| 6,207,606 B1 | 3/2001 | Lue et al. |
| 6,528,670 B1 | 3/2003 | Rix |
| 6,656,866 B2 | 12/2003 | Wenzel et al. |
| 6,664,348 B2 | 12/2003 | Speca |
| 6,846,770 B2 | 1/2005 | Speca |
| 7,141,632 B2 | 11/2006 | Vaughan et al. |
| 7,192,902 B2 | 3/2007 | Brinen et al. |

(Continued)

FOREIGN PATENT DOCUMENTS

| | | |
|---|---|---|
| EP | 2003166 A | 12/2008 |
| EP | 2374822 A | 10/2011 |

(Continued)

OTHER PUBLICATIONS

Hong, S.C. et al., "Immobilized Me2Si(C5Me4)(N—tBu)TiCl2/(nBuCp)2ZrCl2 Hybrid Metallocene Catalyst System for the Production of Poly(ethylene-co-hexene)With Pseudo-Bimodal Molecular Weight and Inverse Comonomer Distribution", Polymer Engineering and Science, vol. 47, Issue 2, pp. 131-139, 2007, DOI 10.1002/pen.
Kim, J.D. et al., "Copolymerization of Ethylene and a-Olefins with Combined Metallocene Catalysts. III. Production of Polyolefins with Controlled Microstructures" Journal of Polymer Science: Part A: Polymer Chemistry, vol. 38, Issue 9, pp. 1427-1432, 2000.
Iedema, P.D. et al., "Predicting the Molecular Weight Distribution of Polyethylene for Mixed Systems with a Constrained-Geometry Metallocene Catalyst in a Semibatch Reactor", Industrial & Engineering Chemistry Research, vol. 43, Issue 1, pp. 36-50, 2004, DOI: 10.1021/ie030321u.
Chen, K. et al., "Modeling and Simulation of Borstar Bimodal Polyethylene Process Based on a Rigorous PC-SAFT Equation of State of Model", Industrial & Engineering Chemical Research, vol. 53, Issue 51, pp. 19905-19915, 2004.

(Continued)

*Primary Examiner* — Rip A Lee
(74) *Attorney, Agent, or Firm* — Stephen A. Baehl

(57) ABSTRACT

This invention relates to ethylene polymers obtained using a catalyst system comprising fluorided silica, alkylalumoxane activator and at least two metallocene catalyst compounds (a bridged monocyclopentadienyl group 4 transition metal compound and a biscyclopentadientyl group 4 transition metal compound), where the fluorided support has not been calcined at a temperature of 400° C. or more, and is preferably produced using a wet mixing method, such as an aqueous method. The ethylene polymers have: 1) at least 50 mol % ethylene; 2) a reversed comonomer index, mol %, (RCI,m) of 85 or more; 3) a Comonomer Distribution Ratio-2 (CDR-2,m) of the percent comonomer at the z average molecular weight divided by the percent comonomer at the weight average molecular weight plus the number average molecular weight divided by 2 ([% comonomer at Mz]/[% comonomer at ((Mw+Mn)/2)] as determined by GPC of 2.3 or more; and 4) a density of 0.91 g/cc or more.

25 Claims, 6 Drawing Sheets

(56) References Cited

U.S. PATENT DOCUMENTS

| | | |
|---|---|---|
| 7,355,058 B2 | 4/2008 | Luo et al. |
| 7,385,015 B2 | 6/2008 | Holtcamp |
| 7,595,364 B2 | 9/2009 | Shannon et al. |
| 7,619,047 B2 | 11/2009 | Yang et al. |
| 7,855,253 B2 | 12/2010 | Shannon et al. |
| 8,088,867 B2 | 1/2012 | Jiang et al. |
| 8,110,518 B2 | 2/2012 | Marin et al. |
| 8,138,113 B2 | 3/2012 | Yang et al. |
| 8,378,029 B2 | 2/2013 | Liu et al. |
| 8,383,754 B2 * | 2/2013 | Yang .............. C08F 210/16 526/348.5 |
| 8,575,284 B2 | 11/2013 | Luo et al. |
| 8,598,061 B2 | 12/2013 | Yang et al. |
| 8,815,357 B1 | 8/2014 | Inn et al. |
| 8,846,841 B2 * | 9/2014 | Yang .............. C08F 210/16 526/348.5 |
| 9,796,795 B2 * | 10/2017 | Canich ............. C08F 4/65912 |
| 2002/0007023 A1 | 1/2002 | McDaniel et al. |
| 2004/0259722 A1 | 12/2004 | Wang |
| 2005/0288461 A1 | 12/2005 | Jensen et al. |
| 2006/0275571 A1 | 12/2006 | Mure et al. |
| 2012/0130032 A1 | 5/2012 | Hussein et al. |
| 2014/0127427 A1 | 5/2014 | Vantomme et al. |
| 2014/0213734 A1 | 7/2014 | Jiang |
| 2014/0242314 A1 | 8/2014 | Inn et al. |
| 2016/0032027 A1 | 2/2016 | St. Jean et al. |
| 2016/0244535 A1 | 8/2016 | Canich et al. |

FOREIGN PATENT DOCUMENTS

| | | |
|---|---|---|
| WO | 00/12565 A | 3/2000 |
| WO | 02/060957 A | 8/2002 |
| WO | 2003/025027 | 3/2003 |
| WO | 2004/046214 A | 6/2004 |
| WO | 2005/075525 | 8/2005 |
| WO | 2007/067259 A | 6/2007 |
| WO | 2007/080365 A | 7/2007 |
| WO | 2009/146167 A | 12/2009 |
| WO | 2010/021757 | 2/2010 |
| WO | 2012/006272 A | 1/2012 |
| WO | 2012/112259 | 8/2012 |
| WO | 2012/158260 A | 11/2012 |
| WO | 2014/169017 | 1/2014 |
| WO | 2016/171810 A | 10/2016 |

OTHER PUBLICATIONS

Sheu, S., "Enhanced Bimodal PE make the impossible possible", Presentation, Borouge Pte Ltd., Shanghai, 2006.

* cited by examiner

Example 1

Example 4

Example 5

POLYETHYLENE COMPOSITION

PRIORITY CLAIM

This application is a National Phase Application claiming priority to PCT Application Serial No. PCT/US2016/028271 filed Apr. 19, 2016, and claims priority to and the benefit of PCT/US2016/021748 filed Mar. 10, 2016 and U.S. Application Ser. No. 62/149,799, filed Apr. 20, 2015, the disclosures of which are hereby incorporated by reference in their entireties.

FIELD OF THE INVENTION

This invention relates to ethylene polymers prepared from novel catalyst compositions comprising a monocyclopentadienyl transition metal compound, a biscyclopentadientyl transition metal compound, a fluorided support, and an optional activator, and uses thereof.

BACKGROUND OF THE INVENTION

Olefin polymerization catalysts are of great use in industry. Hence, there is interest in finding new catalyst systems that increase the commercial usefulness of the catalyst and allow the production of polymers having improved properties. Catalysts for olefin polymerization are often based on cyclopentadienyl transition metal compounds as catalyst precursors, which are activated either with an alumoxane or with an activator containing a non-coordinating anion.

A typical metallocene catalyst system includes a metallocene catalyst, a support, and an activator. Supported catalyst systems are used in many polymerization processes, often in slurry or gas phase polymerization processes. For example, U.S. Pat. Nos. 6,846,770 and 6,664,348 disclose catalyst compositions containing at least one metallocene, and least one activator and a support that has been fluorided using a fluoride containing compound. See also, WO 05/075525; US 2002/007023; WO 2003/025027; US 2005/0288461; and US 2014/0031504.

Metallocenes are often combined with other catalysts, or even other metallocenes, to attempt to modify polymer properties. See, for example, U.S. Pat. No. 8,088,867. Likewise, U.S. Pat. No. 5,516,848 discloses the use of two different cyclopentadienyl based transition metal compounds activated with alumoxane or non-coordinating anions. In particular, the examples disclose, among other things, catalyst compounds in combination, such as $Me_2Si(Me_4C_5)(N$-$c$-$C_{12}H_{23})TiCl_2$ and rac-$Me_2Si(H_4Ind)ZrCl_2$, or $Me_2Si(Me_4C_5)(N$-$c$-$C_{12}H_{23})TiCl_2$ and $Me_2Si(Ind_2)HfMe_2$, (Ind=indenyl) activated with activators such as methylalumoxane or N,N-dimethyl anilinium tetrakis(pentafluorphenyl)borate to produce polypropylenes having bimodal molecular weight distributions (Mw/Mn), varying amounts of isotacticity (from 12 to 52 weight % isotactic PP in the product in Ex 2, 3 and 4), and having weight average molecular weights over 100,000, and some even as high as 1,200,000 for use as thermoplastics.

See also, U.S. Pat. Nos. 4,701,432; 5,077,255; 7,141,632; 6,207,606; 8,598,061; Hong et al. in *Immobilized Me₂Si(CsMe₄)(N-t-Bu)TiCl₂/(nBuCp)₂ZrCl₂ Hybrid Metallocene Catalyst System for the Production of Poly(ethylene-co-hexene) with Psuedo-bimodal Molecular Weight and Inverse Comonomer Distribution*, (Polymer Engineering and Science-2007, DOI 10.1002/pen, pages 131-139, published online in Wiley InterScience (www.interscience.wiley.com) 2007 Society of Plastics Engineers); US 2012/0130032; U.S. Pat. Nos. 7,192,902; 8,110,518; 7,355,058; 5,382,630; 5,382,631; 8,575,284, 6,069,213; Kim, J. D. et al., J. Polym. Sci. Part A: Polym Chem., 38, 1427 (2000); Iedema, P. D. et al., Ind. Eng. Chem. Res., 43, 36 (2004); U.S. Pat. Nos. 6,656,866; 8,815,357; US 2004/259722; US 2014/0031504; U.S. Pat. Nos. 5,135,526; 7,385,015; WO 2007/080365; WO 2012/006272; WO 2014/0242314; WO 00/12565; WO 02/060957; WO 2004/046214; WO 2009/146167; and EP 2 374 822 A.

Additional references of interest include: PCT/US2016/021757, filed Mar. 10, 2016; WO2012158260A1; U.S. Pat. Nos. 8,378,029B2; 7,855,253B2; 7,595,364B2; US2006275571A1; EP2003166A1; WO2007067259(A1); US 2014/0127427 A1; U.S. Pat. Nos. 7,619,047; 8,138,113; US 2016/0032027; US 2014/0127427; US 2016/0032027; Sheu, S. (2006), "Enhanced bimodal PE makes the impossible possible", http://www.tappi.org/content/06asiaplace/pdfs-english/enhanced.pdf; Chen et al., "Modeling and Simulation of Borstar Bimodal Polyethylene Process Based on Rigorous PC-SAFT Equation of State Model", Industrial & Engineering Chemical Research, 53, pp. 19905-19915, (2014).

There is still a need in the art for new and improved catalyst systems for the polymerization of olefins, in order to achieve increased activity or specific polymer properties, such as high melting point, higher density, high molecular weights, to increase conversion or comonomer incorporation, or to alter comonomer distribution without deteriorating the resulting polymer's properties. It is therefore also an object of the present invention to provide novel supported catalysts systems and processes for the polymerization of olefins such as ethylene using such catalyst systems.

It is therefore also an object of the present invention to provide ethylene polymers having the unique properties of good strength and flexibility.

SUMMARY OF THE INVENTION

This invention relates to ethylene polymer compositions (particularly high density (0.93 g/cm³ or more) polymer compositions) obtained from a catalyst system comprising fluorided silica, alkylalumoxane activator and at least two metallocene catalyst compounds, where the first metallocene is a bridged monocyclopentadienyl group 4 transition metal compound and the second metallocene is a biscyclopentadientyl group 4 transition metal compound, where the fluorided support has not been calcined at a temperature of 400° C. or more.

This invention also relates to a process to produce ethylene polymer compositions comprising: i) contacting in a single reaction zone, in the gas phase or slurry phase, ethylene and $C_3$ to $C_{20}$ comonomer with a catalyst system comprising a fluorided support, an alkyl alumoxane activator, and at least two metallocene catalyst compounds, where the first metallocene is a bridged monocyclopentadienyl group 4 transition metal compound and the second metallocene is a biscyclopentadientyl group 4 transition metal compound, where the fluorided support has not been calcined at a temperature of 400° C. or more, and ii) obtaining an in-situ ethylene polymer composition having: 1) at least 50 mol % ethylene; 2) a reversed comonomer index, mol %, (RCI,m) of 85 or more; and 3) a Comonomer Distribution Ratio-2 (CDR-2,m) of the percent comonomer at the z average molecular weight divided by the percent comonomer at the weight average molecular weight plus the number average molecular weight divided by 2 ([% comonomer at Mz]/[% comonomer at ((Mw+Mn)/2)] as determined by GPC of 2.3 or more; and 4) a density of 0.91 g/cc or more, alternately 0.935 g/cc or more.

This invention also relates to in-situ polymer compositions an in-situ ethylene polymer composition having: 1) at least 50 mol % ethylene; 2) a reversed comonomer index, mol %, (RCI,m) of 85 or more; and 3) a Comonomer Distribution Ratio-2 (CDR-2,m) of the mole percent comonomer at the z average molecular weight divided by the percent mole comonomer at the weight average molecular weight plus the number average molecular weight divided by 2 ([% mole comonomer at Mz]/[% mole comonomer at ((Mw+Mn)/2)] as determined by GPC of 2.3 or more; and 4) a density of 0.91 g/cc or more, alternately 0.935 g/cc or more.

DETAILED DESCRIPTION OF THE INVENTION

Figure 1:
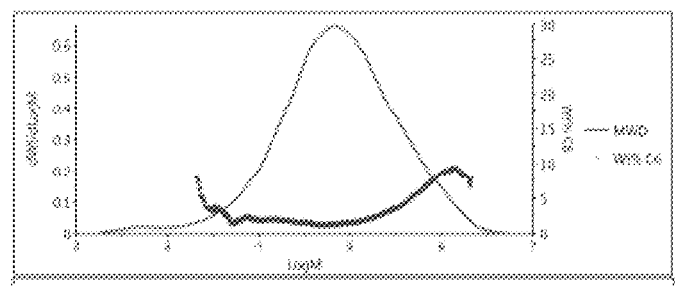
FIG. 1 depicts the GPC-4D molecular weight distribution and co-monomer distribution as a function of molecular weight for examples 1, 4 and 5.
Figure 1:
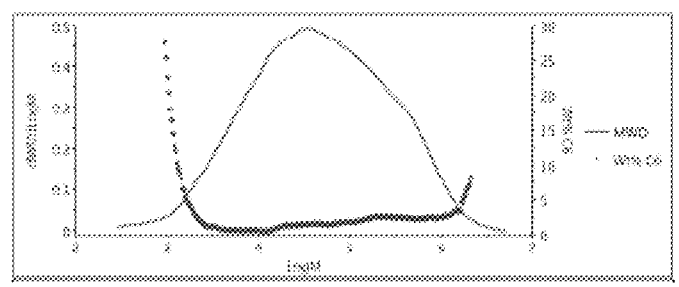
Figure 1:
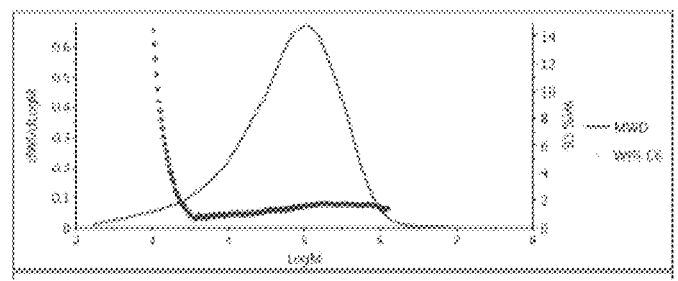
Figure 2:
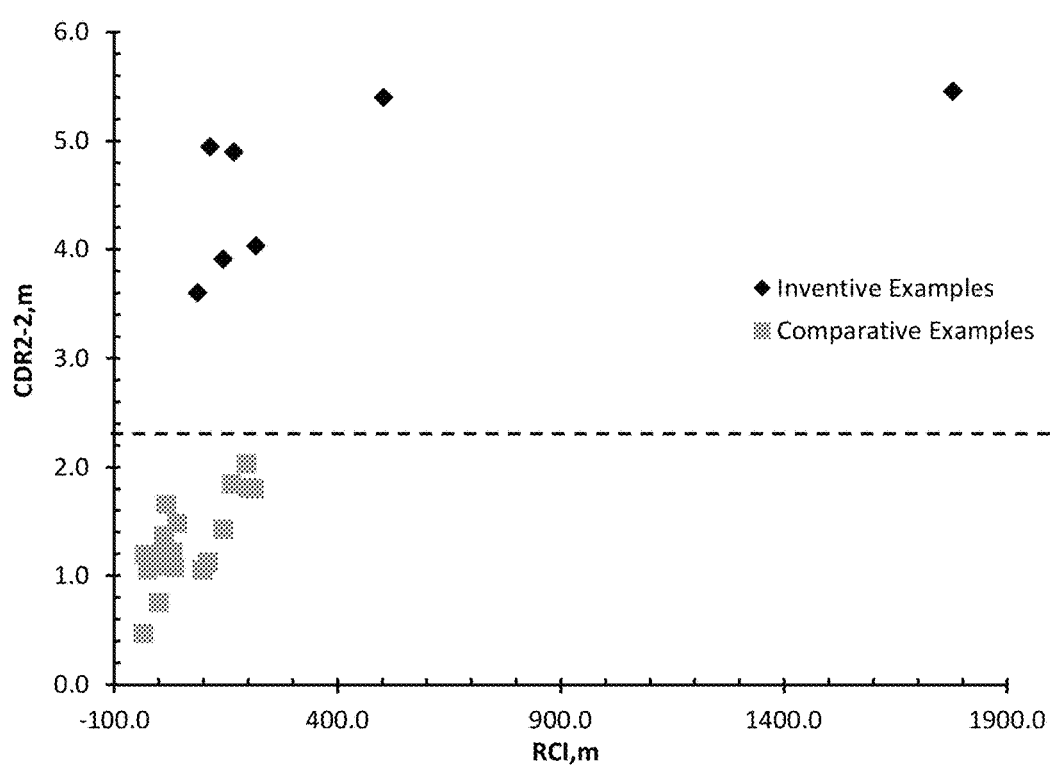
FIG. 2 depicts the co-monomer distribution rate CDR-2,m (calculated by Eq. 14) vs. the A reversed-co-monomer index RCI,m (calculated by Eq. 8) for inventive and comparative compositions.

For the purposes of this invention and the claims thereto, the new numbering scheme for the Periodic Table Groups is used as described in CHEMICAL AND ENGINEERING NEWS, 63(5), pg. 27 (1985).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

For purposes of this invention and the claims thereto, an ethylene polymer having a density of 0.86 g/cm$^3$ or less is referred to as an ethylene elastomer or elastomer; an ethylene polymer having a density of more than 0.86 to less than 0.910 g/cm$^3$ is referred to as an ethylene plastomer or plastomer; an ethylene polymer having a density of 0.910 to 0.940 g/cm$^3$ is referred to as a low density polyethylene; and an ethylene polymer having a density of more than 0.940 g/cm$^3$ is referred to as a high density polyethylene (HDPE). Density is determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

Polyethylene in an overlapping density range, i.e., 0.890 to 0.930 g/cm$^3$, typically from 0.915 to 0.930 g/cm$^3$, which is linear and does not contain long chain branching is referred to as "linear low density polyethylene" (LLDPE) and can be produced with conventional Ziegler-Natta catalysts, vanadium catalysts, or with metallocene catalysts in gas phase reactors and/or in slurry reactors and/or with any of the disclosed catalysts in solution reactors. "Linear" means that the polyethylene has no long chain branches, typically referred to as a g'$_{vis}$ of 0.97 or above, preferably 0.98 or above.

For the purposes of this invention, ethylene shall be considered an α-olefin.

For purposes of this invention and claims thereto, the term "substituted" means that a hydrogen group has been replaced with a heteroatom, or a heteroatom containing group. For example, a "substituted hydrocarbyl" is a radical made of carbon and hydrogen where at least one hydrogen is replaced by a heteroatom or heteroatom containing group.

As used herein, Mn is number average molecular weight, Mw is weight average molecular weight, and Mz is z average molecular weight, wt % is weight percent, and mol % is mole percent. Molecular weight distribution (MWD), also referred to as polydispersity, is defined to be Mw divided by Mn. Unless otherwise noted, all molecular weight units (e.g., Mw, Mn, Mz) are g/mol. The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bn is benzyl, Cp is cyclopentadienyl, Cp* is pentamethyl cyclopentadienyl, Ind is indenyl, Flu is fluorenyl, and MAO is methylalumoxane.

For purposes of this invention and the claims thereto, a "catalyst system" is the combination of at least two catalyst compounds, at least one activator, an optional co-activator, and fluorided support material. For the purposes of this invention and the claims thereto, when catalyst systems are described as comprising neutral stable forms of the components, it is well understood by one of ordinary skill in the art, that the ionic form of the component is the form that reacts with the monomers to produce polymers.

In the description herein, the metallocene catalyst may be described as a catalyst precursor, a pre-catalyst compound, metallocene catalyst compound or a transition metal compound, and these terms are used interchangeably.

A metallocene catalyst is defined as an organometallic transition metal compound with at least one π-bound cyclopentadienyl moiety (or substituted cyclopentadienyl moiety)

and more frequently two π-bound cyclopentadienyl moieties or substituted cyclopentadienyl moieties bound to a transition metal.

For purposes of this invention and claims thereto in relation to metallocene catalyst compounds, the term "substituted" means that a hydrogen group has been replaced with a hydrocarbyl group, a heteroatom, or a heteroatom containing group. For example, methyl cyclopentadiene (Cp) is a Cp group substituted with a methyl group.

For purposes of this invention and claims thereto, "alkoxides" include those where the alkyl group is a $C_1$ to $C_{10}$ hydrocarbyl. The alkyl group may be straight chain, branched, or cyclic. The alkyl group may be saturated or unsaturated. In some embodiments, the alkyl group may comprise at least one aromatic group.

This invention also relates to a catalyst system comprising a fluorided support, an alkylalumoxane activator, and at least two metallocene catalyst compounds, where the metallocenes are represented by the formula:

$$T_y Cp_m MG_n X_q$$

wherein each Cp is, independently, a cyclopentadienyl group (such as cyclopentadiene, indene or fluorene) which may be substituted or unsubstituted, M is a group 4 transition metal, for example, titanium, zirconium, hafnium, G is a heteroatom group represented by the formula $JR^*_z$ where J is N, P, O or S, and $R^*$ is a $C_1$ to $C_{20}$ hydrocarbyl group and z is 1 or 2, T is a bridging group, and y is 0 or 1, X is a leaving group (such as a halide, a hydride, an alkyl group, an alkenyl group or an arylalkyl group), and m=1 or 2, n=0, 1, 2 or 3, q=0, 1, 2 or 3, and the sum of m+n+q is equal to the oxidation state of the transition metal; wherein m=1, n=1 and y=1 in the first metallocene catalyst compound; and n=0 and m=2 in the second metallocene catalyst compound, provided that when y=1 in the second metallocene compound, then at least one Cp is preferably not an indene group.

This invention relates to a catalyst system comprising a fluorided support, an alkylalumoxane activator, and at least two metallocene catalyst compounds, where the first metallocene is a bridged monocyclopentadienyl group 4 transition metal compound and the second metallocene is a biscyclopentadientyl group 4 transition metal compound, preferably the metallocenes are represented by the formula:

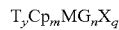
$$T_y Cp_m MG_n X_q$$

wherein Cp is a cyclopentadienyl group (such as cyclopentadiene, indene or fluorene) which may be substituted or unsubstituted, M is a group 4 transition metal, for example, titanium, zirconium, hafnium, G is a heteroatom group represented by the formula $JR^*_z$ where J is N, P, O or S, and $R^*$ is a $C_1$ to $C_{20}$ hydrocarbyl group and z is 1 or 2, T is a bridging group, and y is 0 or 1, X is a leaving group (such as a halide, a hydride, an alkyl group, an alkenyl group or an arylalkyl group), and m=1 or 2, n=0, 1, 2 or 3, q=0, 1, 2 or 3, and the sum of m+n+q is equal to the oxidation state of the transition metal (preferably 2, 3, 4, 5 or 6, preferably 4); wherein m=1, n=1 and y=1 in the first metallocene catalyst compound and n=0 and m=2 in the second metallocene catalyst compound, provided that when y=1 in the second metallocene compound, then at least one Cp is preferably not an indene group.

Generally, two or more different catalyst compounds are present in the catalyst system used herein. When two transition metal compound based catalysts are used as a mixed catalyst system, the two transition metal compounds are preferably chosen such that the two are compatible. A simple screening method such as by $^1H$ or $^{13}C$ NMR, known to those of ordinary skill in the art, can be used to determine which transition metal compounds are compatible. It is preferable to use the same activator for the transition metal compounds, however, two different activators, such as a non-coordinating anion activator and an alumoxane can be used in combination. If one or more transition metal compounds contain an $X_1$ or $X_2$ ligand which is not a hydride, hydrocarbyl, or substituted hydrocarbyl, then the alumoxane may be contacted with the transition metal compounds prior to addition of the non-coordinating anion activator.

The two transition metal compounds (pre-catalysts) may be used in any ratio. Preferred molar ratios of (A) monocyclopentadienyl transition metal compound to (B) biscyclopentadienyl transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B. The combined catalyst compounds are present on the support at 1 to 100 μmol/g supported catalyst, preferably 20-60 μmol/g supported catalyst.

In a preferred embodiment of the invention, molar ratios of (A) monocyclopentadienyl transition metal compound to (B) biscyclopentadienyl transition metal compound fall within the range of (A:B) 1:1 to 10:1, alternatively 2:1 to 5:1, and optionally the comonomer is C3 to C12 alpha olefin, preferably butene, hexene and/or octene. This invention also relates to metallocene catalyst compositions comprising the reaction product of at least four components: (1) one or more bridged metallocenes having one cyclopentadienyl group; (2) one or more metallocenes having two or three cyclopentadienyl groups; (3) one or more alkylalumoxane activators; and (4) one or more fluorided support compositions, where the fluorided support composition has not been calcined at 400° C. or more, preferably the fluorided support composition has been calcined at a temperature of 100° C. to 395° C., alternately 125° C. to 350° C., alternately 150° C. to 300° C.).

Typically, the fluorided supports described herein are prepared by combining an aqueous solution of fluorinating agent (such as $SiF_4$ or $(NH_4)_2SiF_6$) with a slurry of support (such as a toluene slurry of silica), then drying until it is free flowing, and optionally, calcining (typically at temperatures over 100° C. for at least 1 hour). The supports are then combined with activator(s) and catalyst compounds (separately or together).

Fluorided Supports

As used herein, the phrases "fluorided support" and "fluorided support composition" mean a support, desirably particulate and porous, which has been treated with at least one inorganic fluorine containing compound. For example, the fluorided support composition can be a silicon dioxide support wherein a portion of the silica hydroxyl groups has been replaced with fluorine or fluorine containing compounds. Likewise, the term "support composition" means a support, desirably particulate and porous, which has been treated with at least one fluorine containing compound. Suitable fluorine containing compounds include, but are not limited to, inorganic fluorine containing compounds and/or organic fluorine containing compounds.

Supports suitable for use in this invention are generally porous materials and can include organic materials, inorganic materials and inorganic oxides. Desirably, supports suitable for use in this invention include talc, clay, silica, alumina, magnesia, zirconia, iron oxides, boria, calcium oxide, zinc oxide, barium oxide, thoria, aluminum phosphate gel, polyvinylchloride and substituted polystyrene and mixtures thereof. Other useful support materials include zeolites, clays, organoclays, or any other organic or inorganic support material and the like, or mixtures thereof.

Preferably, the support material is an inorganic oxide in a finely divided form. Suitable inorganic oxide materials for use in the catalyst systems described herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2$/$Al_2O_3$. In a preferred embodiment, of the invention, the support is silica.

It is preferred that the support material, preferably an inorganic oxide, preferably silica, has a surface area in the range of from about 10 to about 800 $m^2/g$ (alternately about 10 to about 700 $m^2/g$), pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. Most preferably, the surface area of the support material is in the range from about 100 to about 400 $m^2/g$, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Useful silicas are marketed under the trade names of DAVISON™ 952, DAVISON™ 948 or DAVISON™ 955 by the Davison Chemical Division of W. R. Grace and Company. Total surface area, also referred to as "surface area" and total pore volume, also referred to as "pore volume", and average pore diameter are measured by the Brunauer-Emmett-Teller (BET) method using adsorption-desorption of nitrogen (temperature of liquid nitrogen, 77 K) with a Micromeritics Tristar II 3020 instrument after degassing of the powders for 4 hrs. at 350° C. More information regarding the method can be found, for example, in "*Characterization of Porous Solids and Powders: Surface Area, Pore Size and Density*", S. Lowell et al., Springer, 2004. Average particle size, also referred to as "particle size," or "particle diameter" is determined using a Mastersizer™ 3000 (range of 1 to 3500 µm) available from Malvern Instruments, Ltd. Worcestershire, England.

In a particularly useful embodiment, the support is silica, is desirably porous, and has a surface area in the range of from about 10 to about 800 $m^2/g$, a total pore volume in the range of from about 0.1 to about 4.0 cc/g and an average particle diameter in the range of from about 10 to about 500 µm. More desirably, the surface area is in the range of from about 50 to about 500 $m^2/g$, the pore volume is in the range of from about 0.5 to about 3.5 cc/g and the average particle diameter is in the range of from about 15 to about 150 µm. Most desirably the surface area is in the range of from about 100 to about 400 $m^2/g$, the pore volume is in the range of from about 0.8 to about 3.0 cc/g and the average particle diameter is in the range of from about 20 to about 100 µm. The average pore diameter of typical porous silicon dioxide support materials is in the range of from about 10 to about 1000 Å. Desirably, the support material has an average pore diameter of from about 50 to about 500 Å, and most desirably from about 75 to about 350 Å.

The fluorine compounds suitable for providing fluorine for the support may be organic or inorganic fluorine compounds and are desirably inorganic fluorine containing compounds. Such inorganic fluorine containing compounds may be any compound containing a fluorine atom as long as it does not contain a carbon atom. Particularly desirable are inorganic fluorine-containing compounds selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A useful method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is preferably in the range of from 0.1 to 25 wt %, alternately 0.19 to 19 wt %, alternately from 0.6 to 3.5 wt %, based upon the weight of the support.

Another method of treating the support with the fluorine compound is to dissolve the fluorine compound in a solvent, such as water, and then contact the support (dry or combined with water or hydrocarbon solvent) with the fluorine compound containing solution. When water is used and silica is the support, it is desirable to use a quantity of water which is less than the total pore volume of the support.

A disadvantage of typical dry mix methods is that the density difference between fluorinating agent (such as ammonium hexafluorosilicate—density about 2.1 $g/cm^3$) and silica (e.g., such as Davison™ 948—density about 0.7 $g/cm^3$) makes it difficult to evenly/homogeneously distribute the fluorinating agent in the silica support. The density difference has also led to settling of ammonium hexafluorosilicate in fluorided silica derived from dry mix method. Over a period of two weeks, a vertical gradient of ammonium hexafluorosilicate concentrations in fluorided silica (made via dry mix method) stored in a bottle was observed. Such settling can lead to operational problems on a commercial scale. To overcome these problems, an alternative method (wet-mixing) has been developed. The aqueous (wet-mixing) method employs a minimal amount of a polar solvent (e.g., water, or methanol, ethanol, isopropanol, any solvent capable of dissolving the fluoride compound (such as ammonium hexafluorosilicate) to dissolve the fluorinating agent (e.g., ammonium hexafluorosilicate). The fluoride compound solution (such as an ammonium hexafluorosilicate solution) is then added to a slurry of silica in a non-polar solvent (e.g., toluene, or benzene, chloroform, etc.), followed by vigorous stirring of the resulting mixture. The polar/hydrophilic nature of the fluoride compound (such as ammonium hexafluorosilicate) leads to its absorption onto the hydrophilic silica surface. When the non-polar solvent is removed (by filtration), silica with an even distribution of fluorinating agent (such as ammonium hexafluorosilicate) is obtained, and ready for subsequent drying and calcination steps.

The fluorided support material is then typically slurried in a non-polar solvent and the resulting slurry is contacted with a solution of a metallocene compounds and activator. In some embodiments, the slurry of the fluorided support material is first contacted with the activator for a period of time in the range of from about 0.5 hours to about 24 hours, from about 1 hour to about 16 hours, or from about 2 hours to about 8 hours. The solution of the metallocene compound is then contacted with the isolated fluorided support/activator. In some embodiments, the supported catalyst system is generated in situ. In alternate embodiment, the slurry of the fluorided support material is first contacted with the catalyst compound for a period of time in the range of from about 0.5 hours to about 24 hours, from about 1 hour (or 2 hours) to about 16 hours, or from about 2 hours (or 4 hours) to about 8 hours. The slurry of the supported metallocene compound is then contacted with the activator solution.

The mixture of the metallocenes, activator and fluorided support may be heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

In a preferred embodiment of the invention, the fluorided support material in slurried in a non-polar solvent and the resulting slurry is contacted with a solution of methylalumoxane (typically 30 wt % MAO in toluene). The fluorided support/MAO mixture is then heated to elevated temperature (30° C. to 120° C., preferably 80 to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of metallocene compound/compounds is then contacted with the support/activator slurry. Vigorous stirring may then be applied.

In a preferred embodiment of the invention, the fluorided support material is slowly added in solid form to a solution of MAO in non-polar solvent (e.g., toluene) (typically at room temperature) with vigorous stirring. This addition sequence, namely slow and portion-wise addition of fluorided silica to MAO solution, is referred to as "reversed addition". After the addition of fluorided silica is completed, the fluorided support/MAO mixture is then heated to elevated temperature (30° C. to 120° C., preferably 80 to 100° C.) with vigorous stirring for a period of time (0.1 to 24 hours, preferably 1 to 3 hours). The support/activator is isolated by filtration, rinsed with non-polar solvent (e.g., toluene, pentane, hexane, etc.), and dried. The isolated support/activator is then slurried in a non-polar solvent (e.g., toluene), and a solution of metallocene compound/compounds is then contacted with the support/activator slurry. Vigorous stirring may be applied.

Under otherwise identical conditions, the "reversed addition" method for immobilizing MAO on fluorided silica surface offers higher polymerization activity for a wide variety of catalysts, compared to the "traditional addition" method where MAO solution is added to a slurry of fluorided silica in non-polar solvent.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

In a preferred embodiment of the invention, the fluorided supports described herein are prepared by combining an aqueous solution of fluorinating agent (such as $(NH_4)_2SiF_6$) with a slurry of support (such as a toluene slurry of silica), drying until free flowing, optionally, calcining (typically at temperatures from 100° C. to 400° C. for at least 1 hour), then combining with activators and catalyst compounds (the activators and catalyst compounds may be added to the support separately or together).

In another embodiment of the invention, the water to solvent ratio (by weight) is between 1:10 to 1:1000, preferably between 1:20 to 1:50.

In another embodiment of the invention, the fluorided silica support can immobilize greater than 5.0 mmol "Al" per gram silica, and preferably greater than 6.0 mmol "Al"/gram silica. The amount of "Al" (from alkylalumoxane, such as MAO) that can be immobilized on 1 gram of fluorided silica is determined by an aluminum titration experiment. The titration is done at 100° C. at ambient pressure allowing the alumoxane (15 mmol Al) and the 1 gram of fluorided silica to react for 3 hours. Thereafter, the silica is washed with toluene (10 ml, 3 times) and then washed with pentane (10 ml, 3 times). The solid is then collected and dried in vacuo for 8 hours until solvent is removed. Then the sample is weighed and the difference in weight is divided by the Mw of the aluminum compound (Mw as reported in the CHEMICAL AND ENGINEERING NEWS, 63(5), pg. 27 (1985)). Methyl alumoxane is defined to be Me-Al—O. The "Al" uptake for silica-1 in the examples below was about 5.5 mmol Al/gram, whereas the "Al" uptake for silica-2 was about 6.8 mmol/gram. Higher Al uptake (or loading) is often desirable as it is thought to offer higher polymerization activity, provided the silica and the catalyst precursor stay unchanged. In a useful embodiment of the invention, the catalyst system comprising the fluorided silica support immobilizes greater than 5.0 mmol "Al" per gram of silica, and preferably greater than 6.0 mmol "Al" per gram of silica.

Alternately, the fluorided silica support preferably contains less than 0.05 mmol/gram fluorinating agent (such as $(NH_4)_2SiF_6$), preferably less than 0.02 mmol/gram fluorinating agent, as measured by $^1H$ NMR.

Alternately, the surface area of the fluorided silica support is greater than 200 m$^2$/g, preferably greater than 250 m$^2$/g, as determined by BET. Alternatively, the surface area of combined fluorided silica support and activator (such as MAO) is greater than 250 m$^2$/g, preferably greater than 350 m$^2$/g, as determined by BET.

In embodiments where SiF4 and/or $(NH_4)_2SiF_6$ is/are the fluoriding agent, immediately after combination of the alkylalumoxane with the fluorided support the combination preferably contains less than 0.04 mmoles per gram of silica (preferably less than 0.02 mmoles, preferably less than 0.01 mmoles) of tetraalkylsilane per gram of support as determined by $^1$H NMR (where the alkyl is derived from the alkylalumoxane).

In useful embodiments, the ratio of mmol of fluorine per gram of silica in the fluorided support is between 0.1 and 1.5, preferably between 0.2 and 1.2, preferably between 0.4 and 1.0.

For fluorided silica prepared using $(NH_4)_2SiF_6$, the amount of residual $(NH_4)_2SiF_6$ in the silica should be equal or less than 0.04 mmol $(NH_4)_2SiF_6$/g silica, preferably equal or less than 0.02 mmol $(NH_4)_2SiF_6$/g silica, more preferably equal or less than 0.01 mmol $(NH_4)_2SiF_6$/g silica.

Catalyst Compounds

Useful catalysts include compounds represented by the formula: $T_yCp_mMG_nX_q$ wherein Cp is a cyclopentadienyl group (such as cyclopentadiene, indene or fluorene) which may be substituted or unsubstituted, M is a Group 4 transition metal, for example titanium, zirconium, hafnium, vanadium, niobium, tantalum, chromium, molybdenum and tungsten, G is a heteroatom group represented by the formula $JR^*_z$ where J is a group 15 or 16 element, preferably N, P, O or S, and R* is a $C_1$ to $C_{20}$ hydrocarbyl group and z is 1 or 2, T is a bridging group, and y is 0 or 1, each X is, independently, a leaving group, or two X are joined and bound to the metal atom to form a metallocycle ring, or two X are joined to form a chelating ligand, a diene ligand, or an alkylidene ligand; and m=1 or 2, n=0, 1, 2 or 3, q=0, 1, 2 or 3, and the sum of m+n+q is equal to the oxidation state of the transition metal (preferably 2, 3, 4, 5, or 6, preferably 4 or 5, preferably 4). In the present invention at least two metallocenes are present on the support where in the first metallocene m is 1, n is 1, and y is 1 and in the second metallocene n is 0 and m is 2, provided that when y=1 in the second metallocene compound, then at least one Cp is preferably not an indene group.

In a preferred embodiment of the invention, M is a Group 4 transition metal (preferably Hf, Ti and/or Zr) and the two catalyst compounds may have the same or different M. In an embodiment when M is Ti, then m is 1. In another embodiment when M is Zr, then m is 2 or 3. In an embodiment when M is Ti, then m is 1 and when M is Zr, then m is 2. In a useful embodiment, in the first metallocene M is Ti and in the second metallocene M is Hf or Zr.

Typically, each G is, independently, a heteroatom group represented by the formula $JR^*_z$ where J is a group 15 or 16 element, preferably N, P, O or S (preferably N or O, preferably N), and R* is a $C_1$ to $C_{20}$ hydrocarbyl group. Typically, a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl, or an isomer thereof, including t-butyl, cyclododecyl, cyclooctyl and the like) and z is 1 or 2.

In an embodiment, when m is one, n is preferably 1 and G is a heteroatom group represented by the formula $JR^*_z$ where J is a group 15 or 16 element, preferably N, P, O or S (preferably N or O, preferably N), and R* is a linear branched or cyclic hydrocarbyl group having from one to twenty carbon atoms (such as methyl, ethyl, propyl, butyl, pentyl, hexyl, heptyl, octyl, nonyl, decyl, undecyl, dodecyl or an isomer thereof, including t-butyl, cyclodecyl, cyclooctyl and the like) and z is 1 or 2, preferably JR*z is cyclododecyl amido, t-butyl amido, and or 1-adamantyl amido.

In an embodiment, when m is 2 or 3, n is 0.

In an embodiment each X may be, independently, a halide, a hydride, an alkyl group, an alkenyl group or an arylalkyl group.

Alternately, each X is, independently, selected from the group consisting of hydrocarbyl radicals having from 1 to 20 carbon atoms, aryls, hydrides, amides, alkoxides, sulfides, phosphides, halides, dienes, amines, phosphines, ethers, and a combination thereof, (two X's may form a part of a fused ring or a ring system), preferably each X is independently selected from halides, aryls and $C_1$ to $C_5$ alkyl groups, preferably each X is a phenyl, methyl, ethyl, propyl, butyl, pentyl, or chloro group.

Typically, each Cp group is, independently, a substituted or unsubstituted cyclopentadiene, a substituted or unsubstituted indene, or a substituted or unsubstituted fluorene.

Independently, each Cp group may be substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, alkoxy radicals, aryloxy radicals, alkylthio radicals, dialkylamino radicals, alkoxycarbonyl radicals, aryloxycarbonyl radicals, carbamoyl radicals, alkyl- or dialkyl-carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example, tertiary butyl, isopropyl and the like. Other hydrocarbyl radicals include fluoromethyl, fluoroethyl, difluoroethyl, iodopropyl, bromohexyl chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methylbis(difluoromethyl)silyl, bromomethyldimethylgermyl and the like; and disubstituted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorus, oxygen, tin, sulfur, germanium and the like, including olefins such as, but not limited to, olefinically unsaturated substituents including vinyl-terminated ligands, for example but-3-enyl, prop-2-enyl, hex-5-enyl and the like. Also, at least two R groups, preferably two adjacent R groups, may be joined to form a ring structure having from 3 to 30 atoms selected from carbon, nitrogen, oxygen, phosphorus, silicon, germanium, aluminum, boron or a combination thereof.

In an embodiment of the Cp group, the substituent(s) R are, independently, hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a $C_1$ to $C_{20}$ hydrocarbyl substituted with an N, O, S and or P heteroatom or heteroatom containing group (typically having up to 12 atoms, including the N, O, S and P heteroatoms).

Non-limiting examples of Cp groups include cyclopentadienyl ligands, cyclopentaphenanthreneyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example tetrahydroindenyl ligands. In another embodiment, each Cp may, independently comprise one or more heteroatoms, for example, nitrogen, silicon, boron, germanium, sulfur and phosphorus, in combination with carbon atoms to form an open, acyclic, or preferably a fused, ring or ring system, for example, a heterocyclopentadienyl ancillary ligand. Other Cp ligands include but are not limited to porphyrins, phthalocyanines, corrins and other polyazamacrocycles.

Preferably, T is present and is a bridging group containing at least one Group 13, 14, 15, or 16 element, in particular boron or a Group 14, 15 or 16 element. Examples of suitable bridging groups include P(=S)R', P(=Se)R', P(=O)R', R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R'$_2$SiOSiR'$_2$, R'$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$CS—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', R'$_2$C—PR'—CR'$_2$, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a C$_1$-C$_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group T include CH$_2$, CH$_2$CH$_2$, SiMe$_2$, SiPh$_2$, SiMePh, Si(CH$_2$)$_3$, Si(CH$_2$)$_4$, O, S, NPh, PPh, NMe, PMe, NEt, NPr, NBu, PEt, PPr, Me$_2$SiOSiMe$_2$, and PBu.

In a preferred embodiment of the invention in any embodiment of any formula described herein, T is represented by the formula R$^a$$_2$J or (R$^a$$_2$J)$_2$, where J is C, Si, or Ge, and each R$^a$ is, independently, hydrogen, halogen, C$_1$ to C$_{20}$ hydrocarbyl (such as methyl, ethyl, propyl, butyl, pentyl, hexyl, heptyl, octyl, nonyl, decyl, undecyl, or dodecyl) or a C$_1$ to C$_{20}$ substituted hydrocarbyl, and two R$^a$ can form a cyclic structure including aromatic, partially saturated, or saturated cyclic or fused ring system. Preferably, T is a bridging group comprising carbon or silica, such as dialkylsilyl, preferably T is selected from CH$_2$, CH$_2$CH$_2$, C(CH$_3$)$_2$, SiMe$_2$, SiPh$_2$, SiMePh, silylcyclobutyl (Si(CH$_2$)$_3$), (Ph)$_2$C, (p-(Et)$_3$SiPh)$_2$C, Me$_2$SiOSiMe$_2$, and cyclopentasilylene (Si(CH$_2$)$_4$).

Useful bridged metallocene compounds having one cyclopentadienyl ring include those represented by the formula:

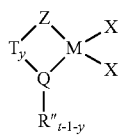

wherein
M is the same as M described above, preferably M is titanium, zirconium or hafnium, preferably titanium;
Z is a substituted or unsubstituted Cp group (useful Z groups are represented by the formula: (C$_5$H$_{4-d}$S*$_d$), where d is 1, 2, 3 or 4, S* is hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a C$_1$ to C$_{20}$ hydrocarbyl substituted with an N, O, S and or P heteroatom or heteroatom containing group (typically having up to 12 atoms, including the N, O, S and P heteroatoms) and two S* may form a cyclic or multicyclic group, preferably Z is tetramethylcyclopentadienyl;
T is a bridging group as described above that is bonded to Z and Q, y is one;
Q is a heteroatom with a coordination number of three from Group 15 or with a coordination number of two from Group 16 of the Periodic Table of Elements, such as N, O, S or P and preferably Q is nitrogen;
R" is selected from a C$_3$-C$_{100}$ substituted or unsubstituted monocyclic or polycyclic ring structure substituent that is partially unsaturated, unsaturated or aromatic; or a C$_2$-C$_{100}$ substituted or unsubstituted, unsaturated or partially unsaturated, linear or branched alicyclic hydrocarbyl substituent; or a C$_1$-C$_{100}$ substituted or unsubstituted saturated hydrocarbyl radical (preferably R" is selected from methyl, ethyl, all propyl isomers, all butyl isomers, phenyl, benzyl, phenethyl, 1-adamantyl, cyclododecyl, cyclohexyl and norbornyl);
t is the coordination number of the heteroatom Q where "t-1-y" indicates the number of R" substituents bonded to Q; and
each X is, independently, a univalent anionic ligand, or two X are joined and bound to the metal atom to form a metallocycle ring, or two X are joined to form a chelating ligand, a diene ligand, or an alkylidene ligand.

Useful metallocenes having two or three cyclopentadienyl rings are represented by the formula:

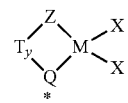

wherein
M is the same as M described above, preferably M is titanium, zirconium or hafnium, Zr or Hf;
Z and Q* are, independently, a substituted or unsubstituted Cp group (useful Z and Q* groups are represented by the formula: (C$_5$H$_{4-d}$S*$_d$), where d is 1, 2, 3 or 4, S* is hydrocarbyl groups, heteroatoms, or heteroatom containing groups, such as methyl, ethyl, propyl, butyl, pentyl, hexyl, heptyl, octyl, nonyl, decyl, undecyl, dodecyl or an isomer thereof, N, O, S, P, or a C$_1$ to C$_{20}$ hydrocarbyl substituted with an N, O, S and or P heteroatom or heteroatom containing group (typically having up to 12 atoms, including the N, O, S and P heteroatoms) and two S* may form a cyclic or multicyclic group;
T is a bridging group as described above that is bonded to Z and Q*, y is zero or one; and each X is, independently, a univalent anionic ligand, or two X are joined and bound to the metal atom to form a metallocycle ring, or two X are joined to form a chelating ligand, a diene ligand, or an alkylidene ligand provided that when y is one then at least one of Z and Q* is preferably not an indene group, alternately both of Z and Q* are not indene. In an alternate embodiment, when y is one, Z and Q* are not 2, 4 substituted indene, preferably are not 2-methyl, 4-phenyl indene.

Particularly useful combinations of catalysts include:
$SiMe_2(Me_4Cp)(cC_{12}N)TiMe_2$ and $bis(1-Bu,3-Me-Cp)ZrCl_2$;
$SiMe_2(Me_4Cp)(cC_{12}N)TiMe_2$ and $(SiMe_2)$ $bis(indenyl)ZrCl_2$;
$SiMe_2(Me_4Cp)(cC_{12}N)TiMe_2$ and $(SiMe_2)_2O$ $bis(indenyl)ZrCl_2$;
$SiMe_2(Me_4Cp)(cC_{12}N)TiMe_2$ and $(SiMe_2)_2O$ $bis(indenyl)ZrMe_2$;
$SiMe_2(Me_4Cp)(cC_{12}N)TiMe_2$ and $SiMe_2(3$-neopentylCp$)((Me_4Cp)HfCl_2$;
$SiMe_2(Me_4Cp)(cC_{12}N)TiMe_2$ and $SiMe_2(3$-neopentylcyclopentadienyl$)(Me_4Cp)HfMe_2$;
$SiMe_2(Me_4Cp)(1$-adamantylamido$)TiMe_2$ and $bis(1-Bu,3-MeCp)ZrCl_2$; and
$SiMe_2(Me_4Cp)(1$-t-butylamido$)TiMe_2$ and $bis(1-Bu,3-MeCp)ZrCl_2$.

In a useful embodiment a third catalyst is present, such as $(Me_2Si)_2O(Ind)_2ZrCl_2$, 2,6-Bis[1-(2-chloro-4,6-dimethylphenylimino)ethyl]pyridine iron(II) dichloride, typically the third catalyst is a different metallocene.

For purposes of this invention one metallocene catalyst compound is considered different from another if they differ by at least one atom. For example "bisindenyl zirconium dichloride" is different from (indenyl)(2-methylindenyl) zirconium dichloride" which is different from "(indenyl)(2-methylindenyl) hafnium dichloride." Catalyst compounds that differ only by isomer are considered the same for purposes of this invention, e.g., rac-dimethylsilylbis(2-methyl 4-phenyl)hafnium dimethyl is considered to be the same as meso-dimethylsilylbis(2-methyl 4-phenyl)hafnium dimethyl.

Synthesis of monocyclopentadienyl complexes is known in the art, and for example, has been disclosed in WO93/19103, U.S. Pat. Nos. 5,096,867 and 5,264,405.

Synthesis of bis cyclopentadienyl complexes is known in the art, and for example, has been disclosed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; 5,391,790; and 7,141,632, each fully incorporated herein by reference.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, used alone or in combination with ionizing anion precursor compounds that abstract a reactive, σ-bound, metal ligand making the metal complex cationic and providing a charge-balancing noncoordinating or weakly coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

Non Coordinating Anion Activators

In alternate embodiments, the alkylalumoxanes can be sued in combination with non-coordinating anion activators. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

The terms "cocatalyst" and "activator" are used herein interchangeably and are defined to be any compound which can activate any one of the catalyst compounds described above by converting the neutral catalyst compound to a catalytically active catalyst compound cation.

Optional Scavengers or Co-Activators

In addition to the activator compounds, scavengers, chain transfer agents or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Preparation of the Supported Catalyst

In an embodiment, this invention describes the preparation of fluorided supports (such as silica) through the addition of a solution of polar solvent (such as water) and fluorine compound (such as $(NH_4)_2SiF_6$) to a slurry of support (such as a toluene slurry of silica). This preparation method contributes to an even distribution of the fluoride compound (such as $(NH_4)_2SiF_6$) onto the support surface (such as the silica surface), in contrast to a less homogeneous distribution observed when the solid salt is combined with the solid silica as described in US 2002/0123582 A1. Metallocenes supported on the fluorided support from this preparation exhibit comparable or higher activity compared to supported metallocenes on fluorided supports made through solid/solid mixing.

In an embodiment, a solution of polar solvent (such as water) and fluorinating agent (such as $(NH_4)_2SiF_6$) is added to a slurry of support (such as a toluene slurry of silica). Vigorous stirring of the mixture allows the dissolved fluorine compound (preferably in water) to be evenly absorbed onto the hydrophilic support surface. After filtration, the wet support is allowed to air dry until it is free flowing, and then may be calcined (typically at temperatures over 100° C. for at least 1 hour).

Polymerization Processes

In embodiments herein, the invention relates to polymerization processes where monomer (such as ethylene), and optionally comonomer (such as hexene), are contacted with a catalyst system comprising the result of the combination of an activator, a fluorided support, and at least two metallocene compounds, as described above. The catalyst compounds, support and activator may be combined in any order, and are combined typically prior to contacting with the monomer.

Monomers useful herein include substituted or unsubstituted C2 to C40 alpha olefins, preferably C2 to C20 alpha olefins, preferably C2 to C12 alpha olefins, preferably ethylene, propylene, butene, pentene, hexene, heptene, octene, nonene, decene, undecene, dodecene and isomers thereof. In a preferred embodiment of the invention, the monomers comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process must be operated above the reaction diluent critical temperature and pressure. Preferably, a hexane or an isobutane medium is employed.

Polyolefin Products

This invention also relates to compositions of matter produced by the methods described herein.

In a preferred embodiment, the process described herein produces ethylene homopolymers or ethylene copolymers, such as ethylene-alphaolefin (preferably C3 to C20) copolymers (such as ethylene-butene copolymers, ethylene-hexene and/or ethylene-octene copolymers) having: a Mw/Mn of greater than 1 to 4 (preferably greater than 1 to 3). Likewise, the process of this invention produces ethylene copolymers. In a preferred embodiment, the copolymers produced herein have from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene).

In a preferred embodiment, the monomer is ethylene and the comonomer is hexene, preferably from 1 to 15 mole % hexene, alternately 1 to 10 mole %.

In particular this invention relates to an in-situ ethylene polymer composition having: 1) at least 50 mol % ethylene; 2) a reversed comonomer index, mol %, (RCI,m) of 85 or more; and 3) a Comonomer Distribution Ratio-2 (CDR-2,m) of the mole percent comonomer at the z average molecular weight divided by the mole percent comonomer at the weight average molecular weight plus the number average molecular weight divided by 2 ([% comonomer at Mz]/[% comonomer at ((Mw+Mn)/2)] as determined by GPC of 2.3 or more; and 4) a density of 0.91 g/cc or more, preferably 0.935 g/cc or more.

The reversed comonomer index (RCI,m or RCI,w) is a measure of comonomer distribution in relation to molecular weight and is calculated using data generated by Gel Permeation Chromatography as described in the Experimental section below.

In any embodiment described herein the polymer produced by the processes described herein has CDR-2,w,w of 2.2 or more, alternately 2.6 or more, alternately 2.6 or more, alternately 2.8 or more, alternately 3.0 or more, alternately 3.2 or more, alternately 3.5 or more, alternately 4.0 or more.

In any embodiment described herein the polymer produced by the processes described herein has RCI,m of 85 or more, alternately 90 or more, alternately 95 or more, alternately 100 or more, alternately 110 or more.

In any embodiment described herein the polymer produced by the processes described herein typically have a Comonomer Distribution Ratio-1 (CDR-1,w) of the weight percent comonomer at the z average molecular weight divided by the weight percent comonomer at the weight average molecular weight (% comonomer Mz/% comonomer Mw) as determined by GPC of 2.0 or more, alternately 2.2 or more, alternately 2.6 or more, alternately 2.8 or more, alternately 3.0 or more, alternately 3.2 or more, alternately 3.5 or more.

In any embodiment described herein the polymer produced by the processes described herein typically have a Comonomer Distribution Ratio-2 (CDR-2,m) of the mole percent comonomer at the z average molecular weight divided by the mole percent comonomer at the weight average molecular weight plus the number average molecular weight divided by 2 ([% comonomer at Mz]/[% comonomer at ((Mw+Mn)/2)] as determined by GPC of 2.3 or more, alternately 2.6 or more, alternately 2.8 or more, alternately 3.0 or more, alternately 3.2 or more, alternately 3.5 or more, alternately 4.0 or more, alternately 4.5 or more.

In any embodiment described herein the polymer produced by the processes described herein typically have a Comonomer Distribution Ratio-3 (CDR-3,w) of the weight percent comonomer at the z average molecular weight plus the weight average molecular weight divided by 2 divided by the weight percent comonomer at the weight average molecular weight plus the number average molecular weight divided by 2 ([% comonomer at ((Mz+Mw)/2)]/[% comonomer at ((Mw+Mn)/2)] as determined by GPC of 2.2 or more, alternately 2.6 or more, alternately 2.8 or more, alternately 3.0 or more, alternately 3.2 or more, alternately 3.5 or more, alternately 4.0 or more, alternately 4.5 or more.

Typically, the polymers produced herein have an Mw of 5,000 to 1,000,000 g/mol (preferably 25,000 to 750,000 g/mol, preferably 50,000 to 500,000 g/mol), and/or an Mw/Mn of greater than 1 to 40 (alternately 1.2 to 20, alternately 1.3 to 10, alternately 1.4 to 5, 1.5 to 4, alternately 1.5 to 3).

In a preferred embodiment, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Usefully, in a preferred embodiment, the polymer produced herein has a bimodal molecular weight distribution as determined by Gel Permeation Chromotography (GPC). By "bimodal" is meant that the GPC trace has two peaks or inflection points.

Unless otherwise indicated Mw, Mn, MWD are determined by GPC as described the Experimental section below.

In a preferred embodiment, the polymer produced herein has a composition distribution breadth index (CDBI) of 50% or more, preferably 60% or more, preferably 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

In another embodiment, the polymer produced herein has two peaks in the TREF measurement (see below). Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement then can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491-499 (1994).

TREF Method

Figure 3:
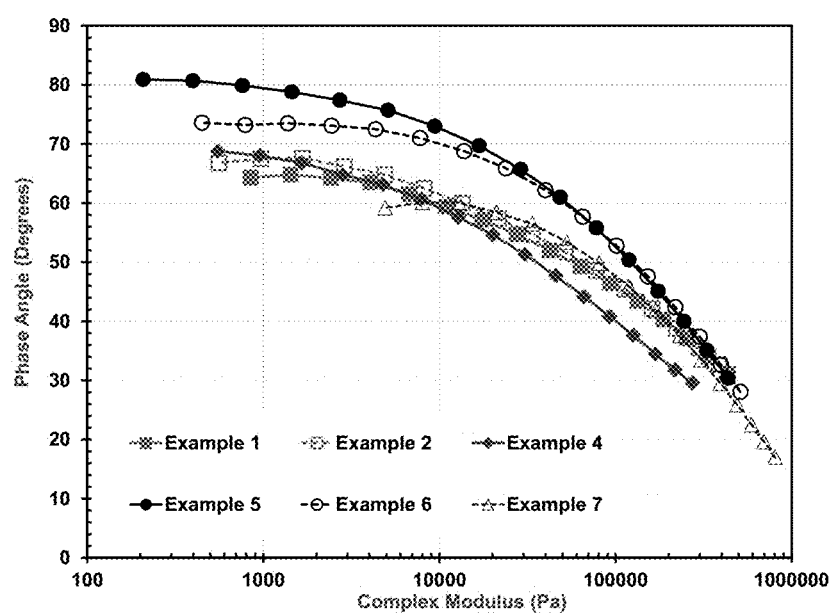
FIG. 3 depicts the complex viscosity vs. angular frequency at 190 C via a SAOS experiment (top) and the Van-Gurp Palmen plot for examples 1, 2, 4, 5, 6, and 7.
Figure 4:
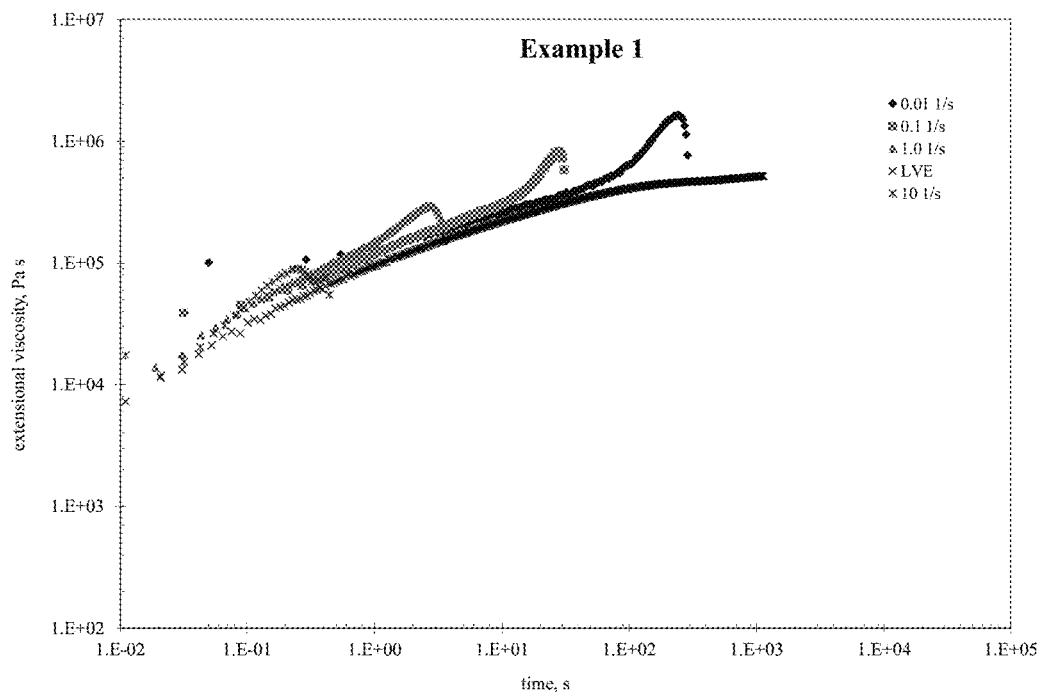
FIG. 4 depicts the time evolution of the elongational viscosity at 150° C. and various Hencky strain rates (0.01-10 s$^{-1}$) determined via SER for examples 1 and 6.
Figure 4:
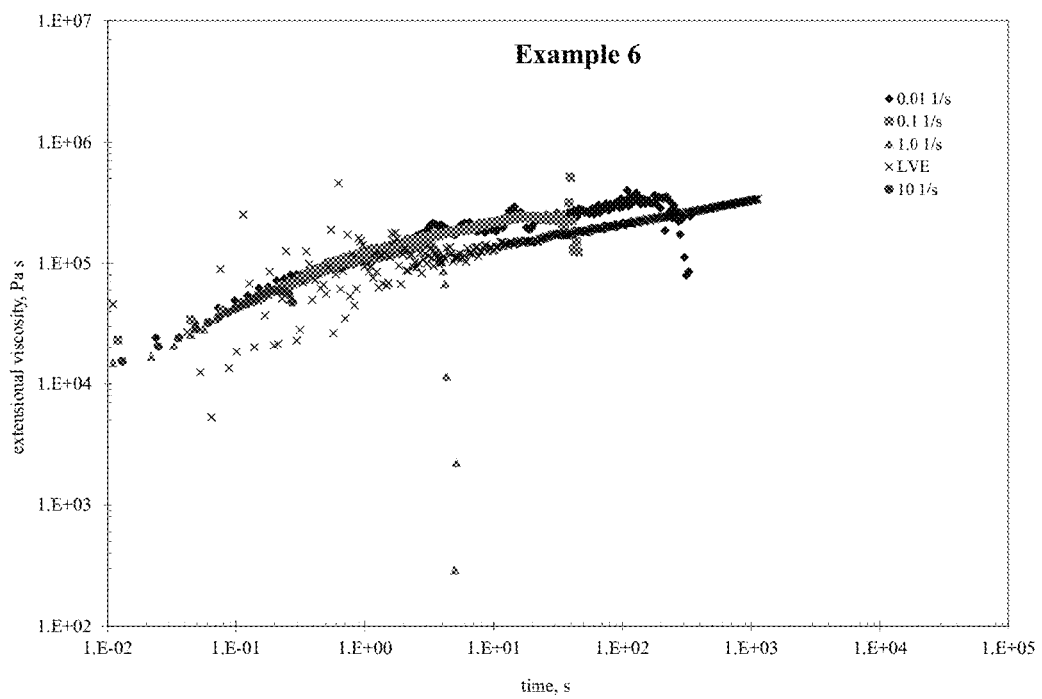
Figure 5:
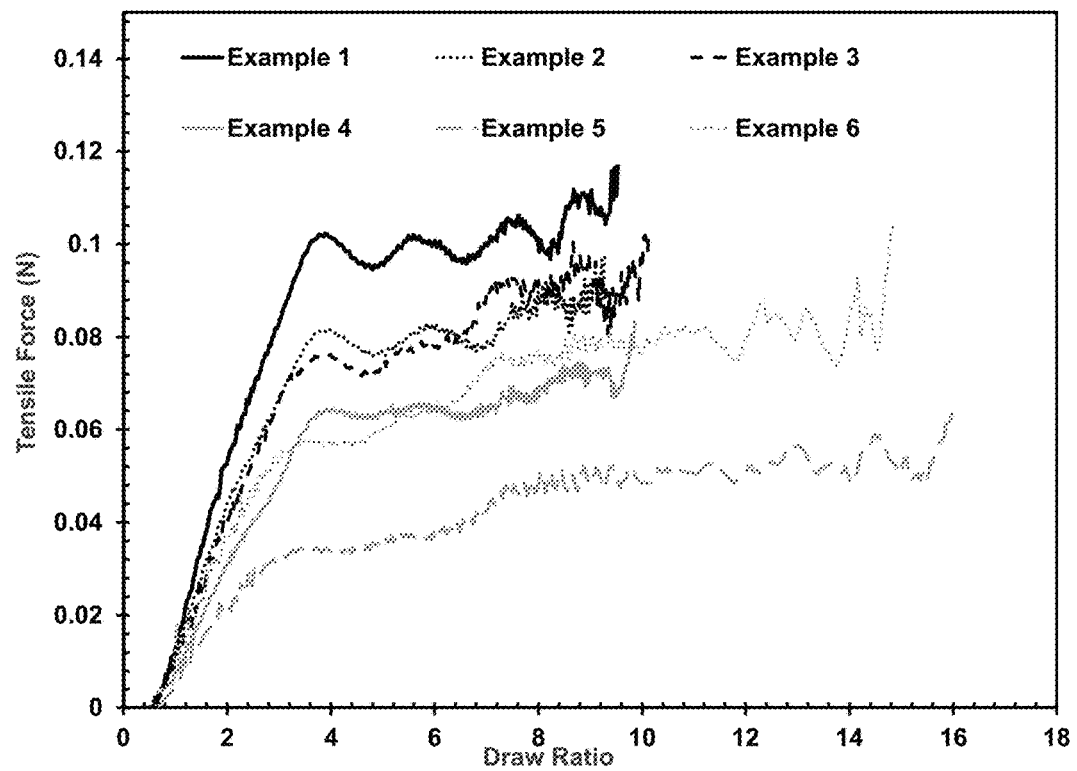
FIG. 5 depicts the tensile force vs, draw ratio determined by a rheotens test for examples 1 to 6.

Temperature Rising Elution Fractionation (TREF) analysis is done using a CRYSTAF-TREF 200+ instrument from Polymer Char, S. A., Valencia, Spain. The principles of TREF analysis and a general description of the particular apparatus to be used are given in the article Monrabal, B.; del Hierro, P. Anal. Bioanal. Chem. 2011, 399, 1557. FIG. 3 of the article is an appropriate schematic of the particular apparatus used; however, the connections to the 6-port valve shown in FIG. 3 differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg but as low as approximately 10 mg) is dissolved in ODCB (25 ml metered at ambient temperature) by stirring at 150° C. for 60 min. A small volume (0.5 ml) of the solution is introduced into a column (15-cm long by 3/8" o.d.) packed with an inert support (of stainless steel balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min before injecting the ODCB flow (1 ml/min) into the column for 10 min to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30 to 140° C. at a rate of 2° C./min while maintaining the ODCB flow at 1 ml/min to elute and measure the dissolving polymer.

An "in-situ polymer composition" (also referred to as an "in-situ blend" or a "reactor blend") is the composition which is the product of a polymerization with two catalyst compounds in the same reactor described herein. Without wishing to be bound by theory it is thought that the two catalyst compounds produce a reactor blend (i.e. an interpenetrating network) of two (or more) components made in the same reactors (or reactions zones) with the two catalysts. In the literature, these sorts of compositions may be referred to as reactor blends, although the term may not be strictly accurate since there may be polymer species comprising components produced by each catalyst compound that are not technically a blend.

An "ex-situ blend" is a blend which is a physical blend of two or more polymers synthesized independently and then subsequently blended together typically using a melt-mixing process, such as an extruder. An ex-situ blend is distinguished by the fact that the polymer components are collected in solid form after exiting their respective synthesis processes, and then combined to form the blend; whereas for an in-situ polymer composition, the polymer components are prepared within a common synthesis process and only the combination is collected in solid form.

In any embodiment described herein the polymer composition produced is an in-situ polymer composition.

In any embodiment of the invention described herein the polymer produced is an in-situ polymer composition having:

1) an ethylene content of 70 wt % or more, preferably 80 wt % or more, preferably 90 wt % or more; and/or 2) a density of 0.910 or more, alternately 0.93 g/cc or more; alternately 0.935 or more, alternately 0.938 or more; and/or 3) a RCI, m of 85 or more, alternately 90 or more, alternately 95 or more, alternately 100 or more, alternately 110 or more; and/or 4) a RCI,w of 2.2 or more, alternately 2.6 or more, alternately 2.6 or more, alternately 2.8 or more, alternately 3.0 or more, alternately 3.2 or more, alternately 3.5 or more, alternately 4.0 or more; and/or 5) Comonomer Distribution Ratio-1 (CDR-1,w) of the weight percent comonomer at the z average molecular weight divided by the weight percent comonomer at the weight average molecular weight (% comonomer Mz/% comonomer Mw) as determined by GPC of 2.0 or more, alternately 2.2 or more, alternately 2.6 or more, alternately 2.8 or more, alternately 3.0 or more, alternately 3.2 or more, alternately 3.5 or more; and/or 6) a Comonomer Distribution Ratio-2 (CDR-2,m) of the mole percent comonomer at the z average molecular weight divided by the mole percent comonomer at the weight average molecular weight plus the number average molecular weight divided by 2 ([% comonomer at Mz]/[% comonomer at ((Mw+Mn)/2)] as determined by GPC of 2.3 or more, alternately 2.6 or more, alternately 2.8 or more, alternately 3.0 or more, alternately 3.2 or more, alternately 3.5 or more, alternately 4.0 or more, alternately 4.5 or more; and/or 7) a Comonomer Distribution Ratio-3 (CDR-3,w) of the weight percent comonomer at the z average molecular weight plus the weight average molecular weight divided by 2 divided by the weight percent comonomer at the weight average molecular weight plus the number average molecular weight divided by 2 ([% comonomer at ((Mz+Mw)/2)]/[% comonomer at ((Mw+Mn)/2)] as determined by GPC of 2.2 or more, alternately 2.6 or more, alternately 2.8 or more, alternately 3.0 or more, alternately 3.2 or more, alternately 3.5 or more, alternately 4.0 or more, alternately 4.5 or more; and/or 8) an I2 of 0.01-10 g/10 min; and/or 9) an IS of 0.05-50 g/10 min; and/or 10) an I21.6 of 0.1-100 g/10 min; and/or 11) a Melt strength via rheotens at 190° C. (die temperature) of >7.5 cN and preferably >8.5 cN; and/or 12) a shear thinning ratio via SAOS $\eta^*(0.01 \text{ rad/s})/\eta^*(118 \text{ rad/s})$ greater than 20 and preferably greater than 30, where the viscosity ratio referring to 190° C. and $\eta^*$ is the complex viscosity; and/or 13) a strain hardening ratio (SHR) via SER at 150° C. of at least 2.8 at a Hencky strain rate of 0.01 $s^{-1}$ and/or at least 2.5 at a Hencky strain rate of 1 $s^{-1}$.

14) an environmental stress crack resistance, ESCR, (10% Igepal, 50° C., Condition B) of greater than 700 hrs. (F50) (on the average of 10 specimens) and preferably greater than 1000 hrs.

In any embodiment of the invention described herein the polymer produced is an in-situ polymer composition having a density of 0.935 or more, alternately form 0.938 to 0.960 g/cc.

Films

Specifically, any of the foregoing polymers, such as the foregoing ethylene copolymers or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Blends

The polymers produced herein may be further blended with additional ethylene polymers (referred to as "second ethylene polymers" or "second ethylene copolymers") and use in film, molded part and other typical polyethylene applications.

In one aspect of the invention, the second ethylene polymer is selected from ethylene homopolymer, ethylene copolymers, and blends thereof. Useful second ethylene copolymers can comprise one or more comonomers in addition to ethylene and can be a random copolymer, a statistical copolymer, a block copolymer, and/or blends thereof. The method of making the second ethylene polymer is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the second ethylene polymers are made by the catalysts, activators and processes described in U.S. Pat. Nos. 6,342,566; 6,384,142; 5,741,563; PCT publications WO 03/040201; and WO 97/19991. Such catalysts are well known in the art, and are described in, for example, ZIEGLER CATALYSTS (Gerhard Fink, Rolf Mülhaupt and Hans H. Brintzinger, eds., Springer-Verlag 1995); Resconi et al.; and I, II METALLOCENE-BASED POLYOLEFINS (Wiley & Sons 2000).

Preferred second ethylene polymers and copolymers that are useful in this invention include those sold by Exxon-Mobil Chemical Company in Houston Tex., including those sold as ExxonMobil HDPE, ExxonMobil LLDPE, and ExxonMobil LDPE; and those sold under the ENABLE™, EXACT™, EXCEED™, ESCORENE™, EXXCO™, ESCOR™, PAXON™, and OPTEMA™ tradenames.

Preferred second ethylene homopolymers and copolymers useful in this invention typically have:

1. an $M_w$ of 20,000 g/mol or more, 20,000 to 2,000,000 g/mol preferably 30,000 to 1,000,000, preferably 40,000 to 200,000, preferably 50,000 to 750,000, as measured by size exclusion chromatography according to the procedure described in the Test Methods section at line 11, page 68, et seq., of WO 2013/043796; and/or 2. an $M_w/M_n$ of 1 to 40, preferably 1.6 to 20, more preferably 1.8 to 10, more preferably 1.8 to 4, preferably 8 to 25 as measured by size exclusion chromatography according to the procedure described in the Test Methods section at line 11, page 68, et seq., of WO 2013/043796; and/or 3. a $T_m$ of 30° C. to 150° C., preferably 30° C. to 140° C., preferably 50° C. to 140° C., more preferably 60° C. to 135° C. as determined by the DSC method according to the procedure described in the Test Methods section at line 11, page 68, et seq., of WO 2013/043796; and/or 4. a crystallinity of 5% to 80%, preferably 10% to 70%, more preferably 20% to 60% (alternatively, the polyethylene may have a crystallinity of at least 30%, preferably at least 40%, alternatively at least 50%, where crystallinity is determined by the DSC method described according to the procedure described in the Test Methods section at line 11, page 68, et seq., of WO 2013/043796); and/or 5. a heat of fusion of 300 J/g or less, preferably 1 to 260 J/g, preferably 5 to 240 J/g, preferably 10 to 200 J/g as measured by the DSC method according to the procedure described in the Test Methods section at line 11, page 68, et seq., of WO 2013/043796; and/or 6. a crystallization temperature (Tc) of 15° C. to 130° C., preferably 20° C. to 120° C., more preferably 25° C. to 110° C., preferably 60° C. to 125° C., as measured by DSC according to the procedure described in the Test Methods section at line 11, page 68, et seq., of WO 2013/043796; and/or 7. a heat deflection temperature of 30° C. to 120° C., preferably 40° C. to 100° C., more preferably 50° C. to 80° C. as measured according to ASTM D648 on injection molded flexure bars, at 66 psi load (455 kPa); and/or 8. a Shore hardness (D scale) of 10 or more, preferably 20 or more, preferably 30 or more, preferably 40 or more, preferably 100 or less, preferably from 25 to 75 (as measured by ASTM D 2240); and/or 9. a percent amorphous content of at least 50%, alternatively at least 60%, alternatively at least 70%, even alternatively between 50% and 95%, or 70% or less, preferably 60% or less, preferably 50% or less as determined by subtracting the percent crystallinity from 100, and/or 10. a branching index ($g'_{vis}$) of 0.97 or more, preferably 0.98 or more, preferably 0.99 or more, preferably 1, as measured according to the procedure described in the Test Methods section at line 11, page 68, et seq., of WO 2013/043796, and/or 11. a density of 0.860 to 0.980 g/cc (preferably from 0.880 to 0.940 g/cc, preferably from 0.900 to 0.935 g/cc, preferably from 0.910 to 0.930 g/cc) (alternately from 0.85 to 0.97 g/cm$^3$, preferably 0.86 to 0.965 g/cm$^3$, preferably 0.88 to 0.96 g/cm$^3$, alternatively between 0.860 and 0.910 g/cm$^3$, alternatively between 0.910 and 0.940 g/cm$^3$, or alternatively between 0.94 to 0.965 g/cm$^3$) (determined according to ASTM D 1505 using a density-gradient column on a compression-molded specimen that has been slowly cooled to room temperature (i.e., over a period of 10 minutes or more) and allowed to age for a sufficient time that the density is constant within +/−0.001 g/cm$^3$).

In another embodiment of the invention, the second ethylene polymer useful herein is produced by polymerization of ethylene and, optionally, an alpha-olefin with a catalyst having as a transition metal component a bis(n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In a particularly desirable embodiment, the second ethylene polymer used herein is a plastomer having a density of 0.91 g/cm$^3$ or less, as determined by ASTM D1505, and a melt index (MI) between 0.1 and 50 dg/min, as determined by ASTM D1238 (190° C., 2.16 kg). In one embodiment, the useful plastomer is a copolymer of ethylene and at least one $C_3$ to $C_{12}$ α-olefin, preferably $C_4$ to $C_8$ =-olefins. The amount of $C_3$ to $C_{12}$ α-olefin present in the plastomer ranges from 2 wt % to 35 wt % in one embodiment, and from 5 wt % to 30 wt % in another embodiment, and from 15 wt % to 25 wt % in yet another embodiment, and from 20 wt % to 30 wt % in yet another embodiment.

Particularly, preferred plastomers useful in the present invention are synthesized using a single-site catalyst, such as a metallocene catalyst, and comprise copolymers of ethylene and higher =-olefins such as propylene, 1-butene, 1-hexene and 1-octene, and which contain enough of one or more of these comonomer units to yield a density between 0.86 and 0.91 g/cm$^3$ in one embodiment. The molecular weight distribution ($M_w/M_n$) of desirable plastomers ranges from 1.5 to 5 in one embodiment and from 2.0 to 4 in another embodiment. Examples of commercially available plastomers are EXACT™ 4150, a copolymer of ethylene and 1-hexene, the 1-hexene derived units making up from 18 wt % to 22 wt % of the plastomer and having a density of 0.895 g/cm$^3$ and MI of 3.5 dg/min (ExxonMobil Chemical Company, Houston, Tex.); and EXACT™ 8201, a copolymer of ethylene and 1-octene, the 1-octene derived units making up from 26 wt % to 30 wt % of the plastomer, and having a density of 0.882 g/cm$^3$ and MI of 1.0 dg/min (ExxonMobil Chemical Company, Houston, Tex.).

The melt index (MI) of preferred second ethylene polymers, as measured according to ASTM D1238 (190° C., 2.16 kg), ranges from 0.02 dg/min to 800 dg/min in one embodiment, from 0.05 to 500 dg/min in another embodiment, and from 0.1 to 100 dg/min in another embodiment. In another embodiment of the present invention, the polyethylene has a MI of 20 dg/min or less, 7 dg/min or less, 5 dg/min or less, or 2 dg/min or less, or less than 2 dg/min. In yet another embodiment, the second ethylene polymer has a Mooney viscosity, ML(1+4) @125° C. (measured according to ASTM D1646) of 100 or less, 75 or less, 60 or less, or 30 or less.

Preferred second ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer (preferably hexene or octene), based upon the weight of the copolymer. The second ethylene copolymers preferably have a composition distribution breadth index (CDBI) of 60% or more, preferably 60% to 80%, preferably 65% to 80%. In another preferred embodiment, the ethylene copolymer has a density of 0.910 to 0.950 g/cm$^3$ (preferably 0.915 to 0.940 g/cm$^3$, preferably 0.918 to 0.925 g/cm$^3$) and a CDBI of 60% to 80%, preferably between 65% and 80%. Preferably these polymers are metallocene polyethylenes (mPEs).

Further useful mPEs include those described in US 2007/0260016 and U.S. Pat. No. 6,476,171, e.g., copolymers of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum, trimethylaluminum, tri-isobutyl aluminum, tri-n-hexylaluminum and the like), which polymer has a Melt Index of from 0.1 to 15 (ASTM D 1238, condition E); a CDBI of at least 70%, a density of from 0.910 to 0.930 g/cc; a Haze (ASTM D1003) value of less than 20; a Melt Index ratio (I21/I1, ASTMD 1238) of from 35 to 80; an averaged Modulus (M) (as defined in U.S. Pat. No. 6,255,426) of from 20,000 to 60,000 psi (13790 to 41369 N/cm$^2$) and a relation between M and the Dart Impact Strength (26 inch, ASTM D 1709) in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength.

Useful second ethylene polymers are mPE homopolymers or copolymers produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings by may substituted or unsubstituted. Several commercial products produced with such catalyst/activator combinations are commercially available from ExxonMobil Chemical Company in Baytown, Tex. under the tradename EXCEED™ Polyethylene or ENABLE™ Polyethylene.

The ethylene polymers and compositions prepared herein can be used in pipe applications, particularly thin walled pipe. Usefully with polyethylene described herein having an environmental stress crack resistance of ESCR of 700 hours or more (F50 ASTM D 1693) can be used in thin walled pipe applications, e.g. where the pipe wall is less than 0.5 inches thick, alternately less than 0.25 inches, alternately less than 0.1 inches, alternately less than 0.03 inches thick.

EXPERIMENTAL

HD 9856B is a high density polyethylene available from ExxonMobil Chemical Company, Houston Tex., having a reported density of 0.957 g/cc and a reported melt index (190° C., 2.16 kg) of 0.46 dg/min.

HD 7800P is a high density polyethylene available from ExxonMobil Chemical Company, Houston Tex., having a reported density of 0.953 g/cc, a reported melt index (190° C., 2.16 kg) of 0.25 dg/min, and a reported high load melt index (190° C., 21.6 kg) of 30 dg/min.

Equistar™ L4904PE is a high density polyethylene available from Lyondell Basell, Houston Tex., having a reported density of 0.949 g/cc, a reported melt index of 0.040 dg/min, and a reported high load melt index of 7 dg/min.

Borsafe™ HE3490-LS is a high density polyethylene available from the Borealis Group (Borouge Pte, Ltd, Singapore), having a reported density of 0.949 g/cc, a reported melt index (190° C., 2.16 kg) of less than 0.1 dg/min.

Paxon™ BA 50-100 is a high density polyethylene available from ExxonMobil Chemical Company, Houston Tex., having a reported density of 0.949 g/cc, a reported melt index (190° C., 2.16 kg) of less than 0.1 dg/min.

HDPE HPA 020 is a high density polyethylene available from ExxonMobil Chemical Company, Houston Tex., having a reported density of 0.952 g/cc, a reported high load melt index (190° C., 21.6 kg) of 9.0 dg/min.

HDPE HYA 600 is a high density polyethylene available from ExxonMobil Chemical Company, Houston Tex., having a reported density of 0.954 g/cc, a reported high load melt index (190° C., 21.6 kg) of 29 9.0 dg/min and a melt index (190° C. 2.16 kg) of 0.35 dg/min).

Paxon™ AL55-003 is a high density polyethylene available from ExxonMobil Chemical Company, Houston Tex., having a reported density of 0.954 g/cc, a reported melt index (190° C., 2.16 kg) of 0.30 dg/min.

Exceed XP 8318ML (comparative example 22) is a linear low density polyethylene available from ExxonMobil Chemical Company, Houston Tex., having a density of 0.920 g/cc and a melt index (190° C., 2.16 kg) of 0.93 dg/min.

Exceed XP 8656ML (comparative example 23) is a linear low density polyethylene available from ExxonMobil Chemical Company, Houston Tex., having a density of 0.917 g/cc and a melt index (190° C., 2.16 kg) of 0.48 dg/min.

Exceed XP 8656MK (comparative example 24) is a linear low density polyethylene available from ExxonMobil Chemical Company, Houston Tex., having a density of 0.920 g/cc and a melt index (190° C., 2.16 kg) of 0.46 dg/min.

Exceed XP 8358A (comparative example 25) is a linear low density polyethylene available from ExxonMobil Chemical Company, Houston Tex., having a density of 0.920 g/cc and a melt index (190° C., 2.16 kg) of 0.50 dg/min.

Comparative example 26 is a linear low density polyethylene made according to U.S. Pat. No. 6,956,088 using the bis(npropylcyclopentadienyl) HfCl$_2$/MAO catalyst system under polymerization conditions to produce an ethylene-based polymer having a density of 0.937 g/cc, a melt index (190° C., 2.16 kg) of 4.4 g/10 min and a high load melt index (190° C., 21.6 kg) of 75.9 g/10 min.

Comparative example 27 is a linear low density polyethylene made according to U.S. Pat. No. 6,956,088 using the bis(npropylcyclopentadienyl) HfCl$_2$/MAO catalyst system under polymerization conditions to produce an ethylene-based polymer having a density of 0.937 g/cc, a melt index (190° C., 2.16 kg) of 4.5 g/10 min and a high load melt index (190° C., 21.6 kg) of 78.4 g/10 min.

Comparative example 28 is a high density polyethylene made according to U.S. Pat. No. 6,956,088 using the bis (npropylcyclopentadienyl)HfCl$_2$/MAO catalyst system under polymerization conditions to produce an ethylene-based polymer having a density of 0.955 g/cc, and a melt index (190° C., 2.16 kg) of 71.7 g/10 min.

Room temperature is 23° C. unless otherwise noted.

MAO is methyl alumoxane (30 wt % in toluene) obtained from Albemarle.

Melt index (MI) also referred to as I2, reported in g/10 min, is determined according to ASTM 1238, 190° C., 2.16 kg load.

Medium load melt index (MI5) also referred to as I5, reported in g/10 min, is determined according to ASTM 1238, 190° C., 5 kg load.

High load melt index (HLMI) also referred to as I21, reported in g/10 min, is determined according to ASTM 1238, 190° C., 21.6 kg load.

Melt index ratio (MIR) is HLMI divided by MI (unless otherwise indicated) is determined by ASTM 1238.

Density is determined according to ASTM D 1505-10. Compression molded samples for density measurements are made according to ASTM D4703-10a. Unless otherwise indicated, 40 hrs. conditioning of the density molded specimens (typically made from pellet samples) takes place at 23° C. before density measurement. In the case of measurement of density of molded specimens made from reactor granule samples, an accelerated conditioning of 2 hrs. at 23° C. of the molded specimens took place before density measurement.

Environmental stress crack resistance (ESCR) is determined by ASTM D1693. Notched constant ligament-stress (NCSL) is determined by ASTM F2136.

Molecular Weight and Comonomer Composition Determination with PolymerChar GPC-IR The distribution and the moments of molecular weight (Mw, Mn, Mw/Mn, etc.) and the comonomer—ethylene (C2), propylene (C3), butene (C4), hexene (C6), octene (C8), etc.—content are determined with a high temperature Gel Permeation Chromatography (Polymer Char GPC-IR and Polymer Char GPC One version 2013 g data-processing program) equipped with a multiple-channel band filter based Infrared detector ensemble IR5, in which a broad-band channel is used to measure the polymer concentration while two narrow-band channels are used for characterizing composition. Three Agilent PLgel 10 µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 mL/min and the nominal injection volume is 200 µL. The whole system including transfer lines, columns, detectors are contained in an oven maintained at 145° C. Given amount of polymer sample is weighed and sealed in a standard vial with 80 µL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IRS broadband signal, I, using the following equation:

$$c = \alpha I \quad (1)$$

where $\alpha$ is the mass constant determined with PE or PP standards. The mass recovery is calculated from the ratio of the integrated area of the concentration chromatography over elution volume and the injection mass which is equal to the pre-determined concentration multiplied by injection loop volume.

The molecular weight is determined by combining universal calibration relationship with the column calibration which is performed with a series of monodispersed polystyrene (PS) standards. The MW is calculated at each elution volume with following equation.

$$\log M_X = \frac{\log(K_{PS}/K_X)}{a_X + 1} + \frac{a_{PS} + 1}{a_X + 1} \log M_{PS} \quad (2)$$

where the variables with subscript "X" stand for the test sample while those with subscript "PS" stand for PS. In this method, $a_{PS}$=0.67 and $K_{PS}$=0.000175 while $a_X$ and $K_X$ are obtained from published literature. Specifically, a/K=0.695/0.000579 for PE and 0.705/0.0002288 for PP.

The comonomer composition is determined by the ratio of the IR detector intensity corresponding to the $CH_3$ and $CH_2$ channels calibrated with a series of PE and PP homo/copolymer standards whose nominal value are predetermined by NMR or FTIR. In particular, this provides the methyl (CH3) per 1000 total carbons (1000 TC), denoted as CH3/1000 TC, as a function of molecular weight. The short-chain branch (SCB) content per 1000 TC, denoted as SCB/1000 TC, is then computed as a function of molecular weight by applying a chain-end correction to the CH3/1000 TC signal, assuming each chain to be linear and terminated by a methyl group at each end. The weight % comonomer is then obtained from the following expression in which f is 0.3, 0.4, 0.6, 0.8, and so on for C3, C4, C6, C8, and so on co-monomers, respectively:

$$w2 = f * SCB/1000 TC \quad (3)$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained $$\text{Bulk IR ratio} = \frac{\text{Area of } CH_3 \text{ signal within integration limits}}{\text{Area of } CH_3 \text{ signal within integration limits}} \quad (4)$$

Then the same calibration of the CH3 and CH2 signal ratio, as mentioned previously in obtaining the CH3/1000 TC as a function of molecular weight, is applied to obtain the bulk CH3/1000 TC. The bulk CH3/1000 TC is converted into bulk SCB/1000 TC and then converted to w2 in the same manner as described above.

The reversed-co-monomer index (RCI,m) is computed from the mole % co-monomer (C3, C4, C6, C8, etc.) signal (x2) as a function of molecular weight, where x2 is obtained from the following expression in which n is the number of carbon atoms in the comonomer (3 for C3, 4 for C4, 6 for C6, etc):

$$x2 = -\frac{200\, w2}{-100\, n - 2\, w2 + n\, w2} \quad (5)$$

Then the concentration signal, W(z) where $z = \log_{10} M$, is modified to W'(z) by setting to 0 the points in W that are less than 5% of the maximum of W; this is to effectively remove points for which the S/N in the composition signal is low. Also, points of W' for molecular weights below 2000 gm/mole are set to 0. Then W' is renormalized so that $$1 = \int_{-\infty}^{\infty} W' dz \quad (6)$$

And a modified weight-average molecular weight ($W_m'$) is calculated over the effectively reduced range of molecular weights as follows:

$$M_w' = \int_{-\infty}^{\infty} 10^z * W' dz \quad (7)$$

The RCI,m is then computed as $$RCI,m = \int_{-\infty}^{\infty} x2(10^z - M_w') W' dz \quad (8)$$

A reversed-co-monomer index (RCI,w) is also defined on the basis of the weight fraction co-monomer signal (w2/100) and is computed as follows:

$$RCI, w = \int_{-\infty}^{\infty} \frac{w2}{100}(10^z - M_w') W' dz \quad (9)$$

Note that in the above definite integrals the limits of integration are the widest possible for the sake of generality;

however, in reality the signal is only integrated over a finite range for which data is acquired, considering the signal in the rest of the non-acquired range to be 0. Also, by the manner in which W' is obtained, it is possible that W' is a discontinuous function, and the above integrations need to be done piecewise.

Three co-monomer distribution ratios are also defined on the basis of the % weight co-monomer, denoted as CDR-1,w, CDR-2,w, CDR-3,w, as follows:

$$CDR\text{-}1, w = \frac{w2(Mz)}{w2(Mw)}$$

$$CDR\text{-}2, w = \frac{w2(Mz)}{w2\left(\frac{Mw+Mn}{2}\right)}$$

$$CDR\text{-}3, w = \frac{w2\left(\frac{Mz+Mw}{2}\right)}{w2\left(\frac{Mw+Mn}{2}\right)}$$

where w2 (Mz) is the % weight co-monomer signal corresponding to a molecular weight of Mz, w2[(Mw+Mn)/2)] is the % weight co-monomer signal corresponding to a molecular weight of (Mw+Mn)/2, where Mw is the average weight molecular weight and Mn the number average molecular weight and w2[(Mz+Mw)/2] is the % weight co-monomer signal corresponding to a molecular weight of Mz+Mw/2.

Accordingly, the co-monomer distribution ratios can be also defined utilizing the % mole co-monomer signal, CDR-1,m, CDR-2,m, CDR-3,m, as $$CDR\text{-}1, m = \frac{x2(Mz)}{x2(Mw)}$$

$$CDR\text{-}2, m = \frac{x2(Mz)}{x2\left(\frac{Mw+Mn}{2}\right)}$$

$$CDR\text{-}3, m = \frac{x2\left(\frac{Mz+Mw}{2}\right)}{x2\left(\frac{Mw+Mn}{2}\right)}$$

where x2 (Mz) is the % mole co-monomer signal corresponding to a molecular weight of Mz, x2[(Mw+Mn)/2)] is the % mole co-monomer signal corresponding to a molecular weight of (Mw+Mn)/2 and x2[(Mz+Mw)/2] is the % mole co-monomer signal corresponding to a molecular weight of Mz+Mw/2.

Small Angle Oscillatory Shear (SAOS) Frequency Sweep Melt Rheology

AOS experiments were performed at 190° C. using a 25 mm parallel plate configuration on an MCR501 rotational rheometer (Anton Paar GmbH). Sample test disks (25 mm diameter, 2.5 mm thickness) were made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for typically 10 min between the parallel plates in the rheometer to erase any prior thermal and crystallization history. An angular frequency sweep was next performed with a typical gap of 1.9 mm from 500 rad/s to 0.01 rad/s angular frequency using 5 points/decade and a strain value within the linear viscoelastic region determined from strain sweep experiments (C. W. Macosko, *Rheology Principles, Measurements and Applications* (Wiley-VCH, New York, 1994). All experiments were performed in a nitrogen atmosphere to minimize any degradation of the sample during the rheological testing.

From the storage (G') and loss (G") dynamic moduli (C. W. Macosko, *Rheology Principles, Measurements and Applications* (Wiley-VCH, New York, 1994)), the loss tangent (tan δ), where δ is the phase (loss) angle which is a measure of melt elasticity, is defined for each angular frequency as follows:

$$\tan\delta = \frac{G''}{G'} \qquad (17)$$

The Van Gurp-Palmen plot [van Gurp, M., Palmen, J. "Time temperature superposition for polymeric blends". Rheol. Bull. (1998) 67(1): pp. 5-8 (Public of Soc. of Rheol.)] is a plot of the measured phase angle δ as defined in Eq. (17) vs. the complex shear modulus |G*(ω)| which is calculated for each angular frequency ω according to Eq. (18):

$$|G^*(\omega)| = (G'^2 + G''^2)^{1/2} \qquad (18)$$

The norm of the complex viscosity |η*| or simply referred to as complex viscosity η* is calculated from G' and G" as a function of frequency ω as follows (C. W. Macosko, *Rheology Principles, Measurements and Applications* (Wiley-VCH, New York, 1994)):

$$|\eta^*(\omega)| = \eta^*(\omega) = \frac{(G'^2 + G''^2)^{1/2}}{\omega} \qquad (19)$$

Van-Gurp Palmen plot (vGP-plot) can be used to extract some information on the molecular characteristics, e.g. linear vs. (long) chain branched chains, type of long chain branching, polydispersity etc. (Dealy, M. J., Larson, R. G., "Structure and Rheology of Molten Polymers", Carl Hanser Verlag, Munich 2006, pp. 182-183). It has been proposed that vGP-plot correlates with the polydispersity of a linear polymer [Trinkle, S., Friedrich, C. "Van Gurp-Palmen plot: A way to characterize polydispersity of linear polymers". Rheol. Acta (2001) 40, pp. 322-328)]. It has been also suggested that vGP-plot can be used to reveal the presence of long chain branching in polyethylene [Trinkle, S., Walter, P., Friedrich, C. "Van Gurp-Palmen plot II—Classification of long chain branched polymers by their topology". Rheol. Acta (2002) 41. Pp. 103-113].

Extensional Rheology

Extensional Rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain hardening of various polyolefins in uniaxial elongational flow," 47(3) THE SOCIETY OF RHEOLOGY, INC., J. RHEOL., 619-630 (2003); and "Measuring the transient extensional rheology of polyethylene melts using the SER universal testing platform," 49(3) THE SOCIETY OF RHEOLOGY, INC., J. RHEOL., 585-606 (2005). The SER instrument consists of paired master and slave windup drums mounted on bearings housed within a chassis and mechanically coupled via intermeshing gears. Rotation of the drive shaft results in a rotation of the affixed master drum and an equal but opposite rotation of the slave drum which causes the ends of the polymer sample to be sound up onto the drums resulting in the sample stretched. The sample is mounted to the drums via securing clamps in most cases. Rectangular sample specimens with dimensions approximately 18.0 mm long× 12.70 mm wide are mounted on the SER fixture. The specimen thickness was typically 0.5-1 mm. Samples are generally tested at 4 Hencky strain rates: 0.01 s$^{-1}$, 0.1 s$^{-1}$, 1 and 10 s$^{-1}$. The testing temperature is 150° C. The polymer samples were prepared as follows. The sample specimens were hot pressed at 190° C. with a Carver Laboratory press. Subsequently, the specimen was mounted to the fixture and equilibrated at 150° C. for typically 5 min.

In addition to the extensional (SER) test, 25 mm disk samples are also tested using start-up of steady shear experiments at vanishingly small shear rates with a parallel plate configuration at vanishing small shear rates, typically 0.01-0.05 s$^{-1}$. This provides the linear viscoelastic envelope (LVE) defined as 3 times the value of the LVE shear stress growth coefficient as a function of strain, as described in "Measuring the transient extensional rheology of polyethylene melts using the SER universal testing platform," 49(3) THE SOCIETY OF RHEOLOGY, INC., J. RHEOL., 585-606 (2005). Generally, the low-strain transient extensional data for all Hencky strain rates tend to collapse ("Crystallization of an ethylene-based butane plastomer: the effect of uniaxial extension", Rheol Acta (2010) 49:931-939). Strain hardening occurs when a polymer is subjected to uniaxial extension and the transient extensional viscosity increases more than what is predicted from linear viscoelastic theory. Strain hardening is observed as abrupt upswing of the extensional viscosity relatively to LVE in the tensile stress growth coefficient versus time or strain plot. A strain hardening ratio (SHR) is used to characterize the deviation/increase in extensional viscosity relative to LVE and is defined as the ratio of the maximum tensile stress growth coefficient before specimen rupture/breakage over 3 times the value of the LVE shear stress growth at the same strain, where strain is the time multipled by the Hencky strain rate. Strain hardening is present in the melt at a given strain rate when SHR>1 at that strain rate.

Melt Strength

Melt strength is measured with a Rheotens device, model 71-97, in combination with the capillary rheometer, model Rheotester 1000, both manufactured by Goettfert. In the rheotens test, the tensile force required for extension/stretching of an extruded melt filament exiting a capillary die is measured as a function of the wheel take-up velocity that increases continuously at a constant acceleration speed. The tensile force typically increases as the wheel (roller) velocity is increased and above a certain take-up velocity the force remain constant until the filament (strand) breaks. The testing conditions are as follows:

Capillary Rheometer (Rheotester 1000)—Die diameter: 2 mm; —Die length over diameter (L/D): 30/2; Die temperature: 190° C.; Piston speed: 0.278 mm/s; Apparent die wall shear rate: 40.1 Strand—Length: 100 mm. Velocity at the die exit: 10 mm/s. Rheotens (model 71-97)—Wheel gap: ~0.7 mm (adjusted depending on extrudate swell); Wheels: grooved; Wheel acceleration speed: 2.4 mm/s$^2$.

For each material several rheotens curves are generate to verify data reproducibility. In fact, the complete amount of material present in the barrel of the Rheotester is extruded through the die and is being picked up by the wheels of the Rheotens device. Once the strand is placed between the wheels, the wheel speed is adjusted till a force 0 is measured. This beginning speed Vs is the speed of the strand through the nip of the wheels at the start of the test. Once the test is started, the speed of the wheels is increased with a 2.4 mm/s$^2$ acceleration and the tensile force is measured for each given speed. After each strand break, or strand slip between the wheels, the measurement is stopped and the material is placed back between the wheels for a new measurement. A new rheotens curve is recorded. Measuring continues until all material in the barrel is consumed. In this invention, the average of the tensile force vs. draw ratio for each material is reported.

Draw ratio is defined as the ratio of the wheel (rotor) take-up velocity over the velocity of the filament (strand) at the die exit (determined from the mass balance using the mass throughput exiting the die, the cross-sectional of the die without taking into account the extrudate swell and assuming a melt density of 0.76 g/cm$^3$). "Melt strength" is defined as the average tensile force (N or cN) corresponding to the horizontal-like (plateau) portion of the rheotens curve before unsteady force oscillation and/or filament rupture/breakage ("Shear and extensional rheology of polymer melts: Experimental and modeling studies". J. Rheol. 55 (2011), pp. 95-126). In cases, where no plateau is observed in the tensile force vs. take-up velocity curve, the melt strength is defined here as the maximum tensile force just before filament slip between the wheels and/or filament rupture/breakage.

X-ray Scattering (WAXS/SAXS)

Figure 6:
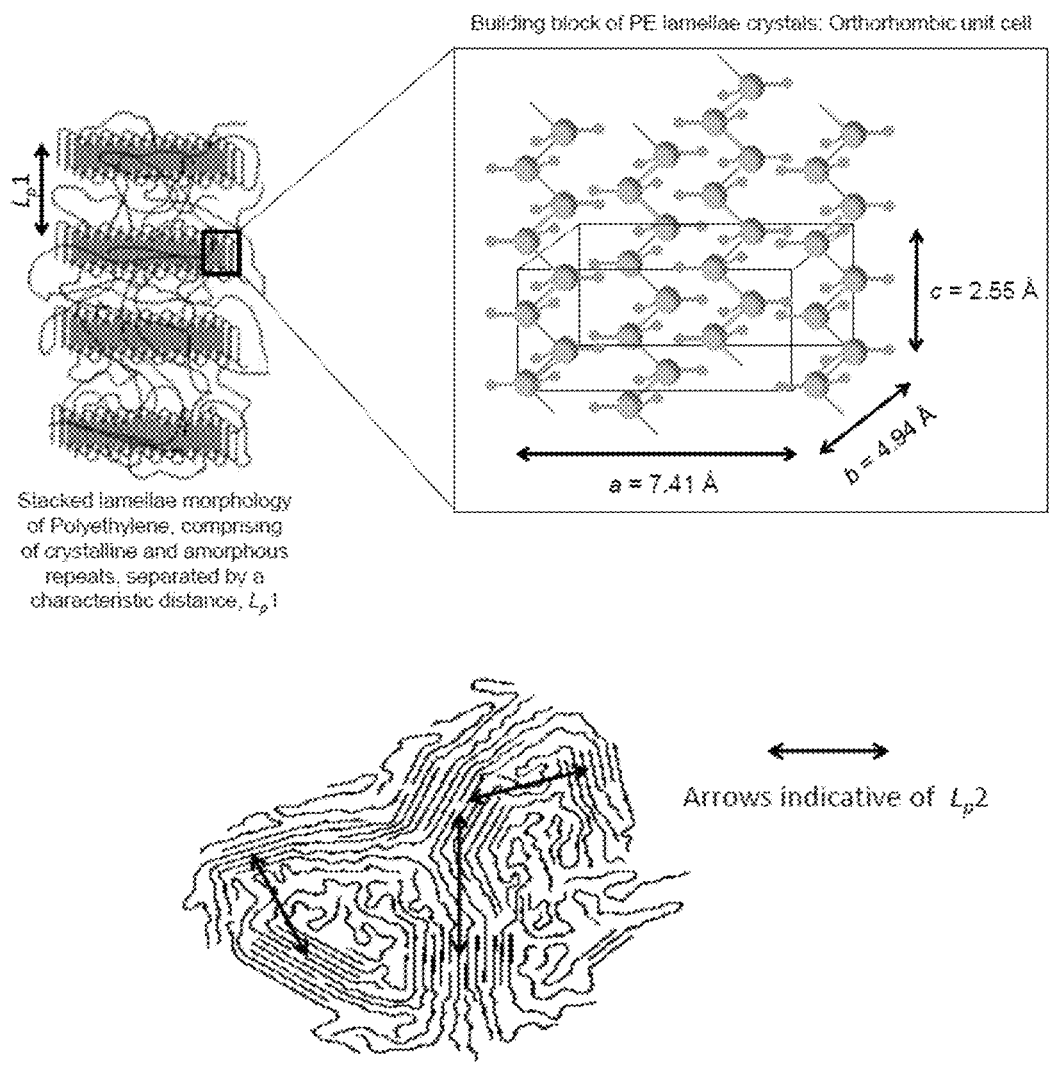
FIG. 6 is a schematic depiction of polyethylene crystallography with demonstration of inter-crystalline spacing Lp1, Lp2 determined via SAXS.

Polyethylene morphology is probed using X-ray scattering methods. Since polyethylene is a semi-crystalline polymer, the crystal structure can be resolved using X-ray diffraction (XRD) or Wide-Angle X-ray Scattering (WAXS). The unit cells of the crystalline polymer are the building blocks of the crystalline lamellae: planar sheets of crystalline material (FIG. 6). Since not all polymer chains can crystallize, amorphous chains also exist and these typically are found in between stacks of crystalline lamellae. WAXS can probe the extent to which these polymer chains crystallize since the data will contain information regarding crystalline and amorphous morphology. WAXS also can determine crystalline orientation and crystallite size. The characteristic repeat distance of the stacked lamellae (long period, Lp, or "inter-crystalline lamellae distances") are determined from Small-Angle X-ray Scattering (SAXS) methods, since the length scales that can be probed by SAXS (3 nm to ~150 nm) are in the region consistent with typical values for lamellae stacking of polyethylene. SAXS can also determine primary and secondary crystalline regions from different values of Lp, which are determined by the maximum intensity values of a peak in an Intensity vs Scattering Angle plot. Lp1 is the domain spacing between adjacent crystallites in primary crystals comprised of stacked lamellae (see FIG. 6). Lp2 is the domain spacing between crystallites in secondary crystals that crystallize at significantly lower temperatures than primary crystallites (see FIG. 6). Generally, primary crystallites will form from the molecules of least comonomer content (i.e., high density molecules). Secondary crystallites will generally form from the molecules that contain the highest comonomer content (i.e., lower density molecules). Co-monomer introduces short chain branching (e.g. hexane introduces butyl short chain branches into the ethylene chain) preventing chain folding and slowing down crystallization.

All small- and wide-angle X-ray scattering (SAXS/WAXS) were performed using an in-house SAXSLAB Ganesha 300 XL+. Polymer pellet samples were melt pressed into discs approximately 0.5 mm thick from a melt of 190 C. Samples were cooled overnight in air and then placed directly in the path of the incident X-ray beam. The incident wavelength was 0.154 nm from a CuKα microfocus sealed tube source (Xenocs). All samples were collected at sample-to-detector positions of 91 mm (WAXS) and 1041 mm (SAXS) and were held in a vacuum to minimize air scatter. The SAXS and WAXS were recorded using a Dectris Pilatus.

Sample to detector distance was calibrated using a Silver Behenate standard. A 0-360 integration was performed on the 2D scattering patterns. The Intensities were recorded as a function of scattering vector, q, where $q=4\pi \sin \theta/\lambda$ ($\theta$ is the scattering angle and $\lambda$ is the incident wavelength) and the scattering vector q is also defined as $q=2\pi/d$ where d is a distance in real space: unit cell dimension from WAXS, and inter-lamellae spacing from SAXS. All data were corrected for transmission, background scattering and detector non-linearity.

The crystallinity of the film samples is obtained from WAXS: unit cell type and overall extent of crystallinity. WAXS and SAXS patterns were collapsed to a I(q) vs q plot. The overall degree of crystallinity of the film samples was determined by taking the ratio of the peak areas of the (110) and (200) reflections (which were fit to a Gaussian function) to the total area underneath the 1D WAXS profile[1]. The amorphous region was also fit to a Gaussian curve. SAXS patterns were collapsed to 1D following the same protocol, and the intensity was multiplied by $q^2$ to correct for the lamellae shape (a Lorentz correction [2]). This provides information pertaining to the structure and inter-lamellae spacing.

Akpalu, Y., et al., Structure Development during Crystallization of Homogeneous Copolymers of Ethene and 1-Octene: Time-Resolved Synchrotron X-ray and SALS Measurements. Macromolecules, 1999. 32(3): p. 765-770; and 2. F. Cser, About the Lorentz correction used in the interpretation of SAXS data of semicrystalline polymers. Journal of Polymer Science Part B-Polymer Physics, 1991. 29: p. 1235-1254.

Preparation of Supported Dual-Metallocene Catalyst Systems.

Fluorided silica-1, fluorided silica-2, supported methylalumoxane, sMAO-1 and sMAO-2 (prepared from fluorided-silica-1 and fluorided-silica-2, respectively), were prepared as described in the example section of PCT/US2016/021748, filed Mar. 10, 2016.

Catalysts

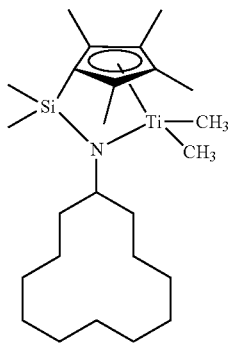

Catalyst A

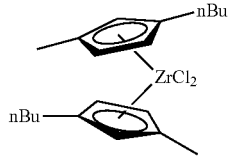

Catalyst B

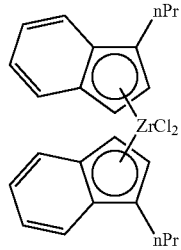

Catalyst C

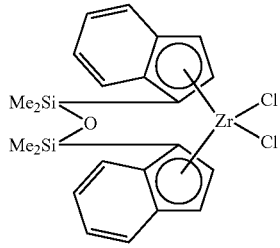

Catalyst D

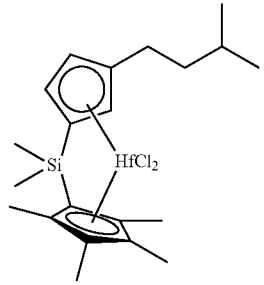

Catalyst E

Catalyst A was synthesized according to preparation described in patent WO 93/19103. Catalyst B was purchased from Boulder and used as received. Catalyst D was synthesized according to US 7,141,632. Catalyst C and E were synthesized as described in the Experimental section of PCT/US2016/021748.

Preparation of Fluorided Silica:

1.18 g $(NH_4)_2SiF_6$ was dissolved in 7.00 g water in a 20 ml glass vial. 50 g of Grace Davison D948™ silica and 200 g of toluene were combined in a 250 ml Wheaton CEL-STIR™. Under vigorous stirring, the aqueous stock solution of $(NH_4)_2SiF_6$ was added via a syringe to the toluene slurry of silica. The mixture was allowed to stir at room temperature for 2.5 h. The slurry was filtered through a 110 ml Optichem™ disposable polyethylene frit, rinsed with 200 g pentane three times, then dried in air overnight to yield a white, free-flowing solid. The solid was transferred into a tube furnace, and was heated under constant nitrogen flow (temperature program: 25° C./h ramped to 150° C.; held at 150° C. for 4 hours; 50° C./h ramped to 200° C.; held at 200° C. for 4 hours; cooled down to room temperature). 46 g of fluorided silica-2 was collected after the calcination. The calculated "F" loading was 0.9 mmol/g.

Preparation of Supported Dual-Metallocene Catalyst Systems.

In a drybox, 66.0 g MAO toluene solution (Albermarle, 13.6 wt % Al) and 100 g of anhydrous toluene were combined in a 250 ml Wheaton CELSTIR™. The stir rate was set to 450 rpm. Every 5 minutes, 5 g of fluorided silica was slowly added to the Celstir. A total amount of 42.5 g of fluorided silica was added over a period of 30 minutes. The resulting slurry was allowed to stir at room temperature for 15 minutes. Then the Celstir was placed in a sand bath heated to 100° C. The slurry was heated at 100° C. for an additional 3 hours at a stirring rate of 215 rpm. The final slurry was filtered through a 110 ml Optichem disposable polyethylene frit. The solid collected in the frit was transferred back to the CELSTIR and slurried in 100 g of anhydrous toluene. The stir rate was set to 450 rpm. In a glass beaker combined catalyst A (1.69 mmol, 0.742 g), catalyst D (0.60 mmol, 0.314 g), and 80 g anhydrous toluene. Dropwisely added the toluene stock solution to the CELSTIR at room temperature. The resulting mixture was allowed to stir for 16 h at room temperature. The final slurry was filtered through a 110 ml Optichem disposable polyethylene frit. The solid collected in the frit was first rinsed with 80 g toluene for 2 times, then 60 g pentane for 3 times. The collected solid was dried in-vacuo for 3 hours to yield the supported dual-catalyst systems as free-flowing yellow powders.

Example A: Polymerization of Ethylene and Hexene

Polymerization was performed in a seven foot tall gas-phase fluidized bed reactor with a 6 inch body and a 10 inch expanded section. Cycle and feed gases were fed into the reactor body through a perforated distributor plate, and the reactor was controlled at 300 psi (2068 kPa) and 70 mol % ethylene. Reactor temperature was maintained by heating the cycle gas. Supported catalyst was fed as a 10 wt % slurry in Sono Jell™ from Sonneborn (Parsippany, N.J.). The slurry was thinned and delivered to the reactor by nitrogen and isopentane feeds in the catalyst probe. Products were collected from the reactor as necessary to maintain the desired bed weight. Average process conditions are listed in Table 1.

TABLE 1

Average reactor conditions

| Reactor Conditions | Example 1 | Example 2 | Comparative Example III |
|---|---|---|---|
| Catalyst A/Catalyst D ratio | 3:1 | 3:1 | |
| Catalyst B | | | 100% |
| Temperature (° F.) | 185 | 185 | 185 |
| Pressure (psi) | 300 | 300 | 300 |
| Ethylene (mole %) | 70 | 69 | 70 |
| Hydrogen (ppm) | 157 | 168 | 175 |
| Hexene (mole %) | 0.44 | 0.34 | 1.58 |
| Bed Weight (g) | 2000 | 2000 | 2000 |
| Residence Time (hr) | 5.7 | 6.4 | 5.4 |
| Cycle Gas Velocity (ft/s) | 1.5 | 1.5 | 1.6 |
| Production Rate (g/hr) | 353 | 314 | 372 |
| Activity ($g_{poly}/g_{supported\ cat}$) | 2050 | 1825 | 1600 |
| Catalyst Slurry Feed (cc/hr) | 2.0 | 2.0 | 2.7 |
| Bulk Density (g/cc) | 0.4049 | 0.3691 | 0.3419 |
| $N_2$ Cat. Probe Feed (cc/min) | 6000 | 6000 | 6000 |
| $iC_5$ Cat. Probe Feed (g/min) | 1 | 1 | 1 |
| MI I2.16 (g/10 min)* | 0.15 | 0.20 | 1.00 |

TABLE 1-continued

Average reactor conditions

| Reactor Conditions | Example 1 | Example 2 | Comparative Example III |
|---|---|---|---|
| MMI I5 (g/10 min)* | 0.70 | 1.00 | |
| HLMI I21.6 (g/10 min)* | 11 | 14 | 20.50 |
| MIR (I21.6/I2.16)* | 73 | 71 | 20.50 |
| Density (g/cm³)* | 0.9448 | 0.9473 | 0.9186 |

*data obtained from granules produced in the reactor by dry blending 0.06% wt. BHT stabilizer in a plastic bag via hand shaking/tumbling..

The Catalyst A/Catalyst D inventive dual catalyst system (Examples 1 and 2) surprisingly showed similar or better activity to comparative Catalyst B despite having significantly less hexene in the reactor. The mixed catalyst system also showed significantly higher molecular weight capability, producing an MI (I2.16) roughly 10 times lower at similar hydrogen levels.

For comparative examples 5 and 6, blending components i and ii were made with polymerization performed with Catalyst B) in an 18.5 foot tall gas-phase fluidized bed reactor with a 10 foot body and an 8.5 foot expanded section. For comparative example 7, component iv was made with Catalyst B) in the same reactor. Cycle and feed gases were fed into the reactor body through a perforated distributor plate, and the reactor was controlled at 300 psi and 70 mol % ethylene. Reactor temperature was maintained by heating the cycle gas. The reactor conditions are summarized in Table 1B.

TABLE 1B

Average reactor conditions for components i and ii used as extruder blending components for comparative examples 5 and 6 and component iv of comparative example 7.

| Reactor Condition | Component i (100% Catalyst B) | Component ii (100% Catalyst B) | Component iv (100% Catalyst B) |
|---|---|---|---|
| Temperature (° F.) | 185 | 185 | 185 |
| Pressure (psi) | 300 | 300 | 300 |
| Ethylene (mole %) | 70.0 | 70.0 | 70 |
| Hydrogen (ppm) | 20 | 312 | 6 |
| C6/C2 mass flow ratio | 0.019 | 0.00 | 0 |
| Bed Weight (lb) | 283 | 285 | 285 |
| Residence Time (hr) | 3.1 | 3.1 | 3.1 |
| Cycle Gas Velocity (ft/s) | 1.90 | 1.90 | 1.90 |
| Activity ($g_{poly}/g_{supported\ cat}$) | 2200 | 1346 | 1075 |
| MI I2.1 (g/10 min)* | 0.1 | 7.4 | N/A |
| HLMI I21 (g/10 min)* | 2.5 | 169 | 0.84 |
| MIR (I21/I2.1)* | 22 | 23 | N/A |
| Density (g/cm³)* | 0.931 | 0.967 | 0.952 |

*data obtained from granules produced in the reactor by dry blending 0.06% wt. BHT stabilizer in a plastic bag via hand shaking/tumbling.

Inventive example 20 corresponds to reactor granules made with Catalyst A/Catalyst D with reactor conditions identical to example h-2 of PCT/US2016/021748 filed Mar. 10, 2016.

Inventive example 21 corresponds to reactor granules made with Catalyst A/Catalyst B with reactor conditions identical to example e-2 of PCT/US2016/021748 filed Mar. 10, 2016.

TABLE 1C

Average reactor conditions for inventive examples 20 and 21.

| | Supported catalyst | |
|---|---|---|
| | Example 20** | Example 21*** |
| | Catalyst composition | |
| Support | Catalyst A/ Catalyst C = 3 Fluoride silica-2 (wet-mix) | Catalyst A/ Catalyst B = 3 Fluoride silica-2 (wet-mix) |
| Temperature (° F.) | 185 | 185 |
| Pressure (psi) | 300 | 300 |
| Ethylene (mole %) | 70.0 | 70.0 |
| Hydrogen (ppm) | 180 | 270 |
| Hexene (mole %) | 2.14 | 1.31 |
| Bed Weight (g) | 2000 | 2000 |
| Residence Time (hr) | 4.8 | 5.0 |
| Cycle Gas Velocity (ft/s) | 1.52 | 1.52 |
| Production Rate (g/hr) | 416 | 399 |
| Activity ($g_{poly}/g_{supported\ cat}$) | 2277 | 2260 |
| Catalyst Slurry Feed (cc/hr) | 2.1 | 2.0 |
| MI I2.1 (g/10 min)* | 0.98 | 1.07 |
| HLMI I21 (g/10 min)* | 40.1 | 26.15 |
| MIR (I21/I2.1)* | 40.9 | 24.37 |
| Density (g/cm$^3$)* | 0.9174 | 0.9185 |
| Bulk Density (g/cc) | 0.3793 | 0.3344 |
| N$_2$ Cat. Probe Feed (cc/min) | 6000 | 6000 |
| iC$_5$ Cat. Probe Feed (g/min) | 1 | 1 |

*data obtained from granules produced in the reactor by dry blending 0.06% wt. BHT stabilizer in a plastic bag via hand shaking/tumbling.
**Example 20 is identical to example h-2 of 2015EM064.
***Example 21 is identical to example e-3 of 2015EM064.

Density data of Tables 1A, 1B, 1C were measured from molded specimens (made according to ASTM D4703-10a) made from reactor granules with an accelerated conditioning of 2 hrs. at 23° C. of the molded specimens before density measurement.

TABLE 2

Properties of inventive examples

| | Example | | | | | | |
|---|---|---|---|---|---|---|---|
| | 1 Pellet of Granule Example 1 | 2 Pellet of Granule Example 2 | 3 Pellet of Granule Example 2 | 8 Pellets of Granule Example 1 | 9 Pellet of Granule Example 2 | 20* | 21* |
| Catalyst A/Catalyst D ratio (3:1) | 3:1 | 3:1 | 3:1 | 3:1 | 3:1 | 3:1 | 3:1 |
| MI I2.16 (g/10 min) | | | 0.30 | 0.19 | 0.25 | 0.98 | 1.07 |
| MMI I5 (g/10 min) | 0.7 | 1.0 | 1.1 | | | | |
| HLMI I21.6 (g/10 min) | 11.0 | 15.6 | 15.6 | 11.1 | 15.0 | 40.1 | 26.6 |
| MIR (I21.6/I2.16) | | | 52 | 58.4 | 60 | 40.9 | 24.86 |
| Density (g/cm$^3$) | 0.947 | 0.950 | 0.950 | 0.947 | 0.951 | 0.917 | 0.919 |

*Inventive examples 20 and 21 are in reactor granule form according to Table 1C.

Data for Example 8 were obtained from pellets made from the reactor granules of Example 1 of Table 1. Data for Examples 3 and 9 were obtained from pellets made from reactor granules of Example 2. Data for Example 1 were obtained from pellets made from reactor granules of Example 1 (Table 1). Data for Example 2 were obtained from pellets made from reactor granules of Example 2 (Table 1).

TABLE 2A

Properties of Comparative Examples.

| Example ID | Resin Description | Co-monomer Type | I2.16 (dg/min) | I5 (dg/min) | I21.6 (dg/min) | Density (g/cm$^3$) |
|---|---|---|---|---|---|---|
| 4 | HD 7800P | C4 | N/A | 1.18 | 26.1 | 0.954 |
| 5 | Catalyst B Based BP18 Extruder Blend | C6 | 0.51 | 0.53 | 15.6 | 0.950 |
| 6 | Catalyst B Based BP18 Extruder Blend | C6 | 0.33 | 1.03 | 9.1 | 0.945 |
| 7 | Catalyst B Based BP18 Extruded Pellets | No Co-monomer | N/A | N/A | 0.6 | 0.952 |
| 10 | HD7800P | C4 | 0.25 | N/A | 24.9 | 0.954 |

*All data of Table 2A are for materials in pellet form.

Comparative examples 5 and 6 are BP 18 extruder melt blends of two components made with Catalyst B in a gas phase reactor as described above (Table 1B). Component i (Catalyst B) is polyethylene granule made with no added $H_2$ in the gas phase reactor and has an $I_2$ of 0.1 g/10 min, an $I21$ of 2.5 g/10 min and a density of 0.931 g/cm³. Component ii (Catalyst B) is polyethylene granule made with no addition of C6 co-monomer in the gas phase reactor and has an $I2$ of 7.4 g/10 min, an $I21$ of 169 g/10 min and a density of 0.967 g/cm³. Comparative example 5 is a blend of 49/51 wt./wt. of granule components i/ii. Comparative example 6 is a blend of 60/40 wt./wt. of granule components i/ii. Both comparative examples 5 and 6 are in pellet form that were produced with a twin screw extruder adding 0.06% wt./wt. Irganox™ 1076 (primary antioxidant) and 1.2% wt./wt. of Irgafos™ 168 (secondary antioxidant) with the procedure described below.

Comparative example 7 are BP 18 extruded pellets made with polyethylene granules corresponding to component iv (Catalyst B) produced according to the reactor conditions of Table 1B. Component iii (Catalyst B) is polyethylene granule made with no addition of C6 co-monomer and no addition of $H_2$ in the gas phase reactor (Table 1B) and has an $I21$ of 0.84 g/10 min and a density of 0.952 g/cm³.

Irganox™ 1076 (primary antioxidant) and 1.2% wt./wt. of Irgafos™ 168 (secondary antioxidant). The additives were added in the reactor granules in a 5 gallon bucket to mix followed by handing shaken/tumbling for 5 minutes to ensure homogenization.

The extruder process conditions for examples are listed in Tables 3A and 3B. A one-hole circular die was used, where the cylindrical strand was passed through a water bath and then entered a Killion strand-cut pelletizer with motor control bronco 2 model 160 manufactured by Warner Electric to produce pellets for further analysis and testing. The mass throughput was determined in lbs./hr by collecting and weighing pellets exiting the pelletizer over a period of time (typically 2 min). The specific energy input (SEI) was estimated as follows:

$$SEI = 1.622 * (\% \text{ Torque}/100) * \frac{\text{Screw } rpm}{500} * \frac{P}{W} \quad (16)$$

where SEI is the specific energy input in kw-hr/kg, P is the extruder motor horsepower in hp (3 hp for the BP 18 extruder) and W is the mass throughput in lbs./hr. In Eq. (16), 500 in the denominator represents the maximum achievable screw rpm for the BP 18 extruder. In Eq. (16), 1.622 is a approximate conversion factor for the units. Melt

TABLE 2B

List of comparative examples

| Example ID | Resin Description | Co-monomer Type | I2.16 (dg/min) | I5 (dg/min) | I21.6 (dg/min) | Density (g/cm³) |
|---|---|---|---|---|---|---|
| 11 | HD 9856B | C4 | 0.48 | 2.04 | 39.8 | 0.957 |
| 14 | Equistar™ L4904 PE | C4 | 0.03 | 0.17 | 7.0 | 0.950 |
| 15 | Borsafe™ HE3490-LS | C4 | 0.05 | 0.25 | 8.5 | 0.962 |
| 16 | Paxon™ BA50-100 | C6 | 0.07 | 0.37 | 10.11 | 0.949 |
| 17 | HDPE HPA 020 | C6 | 0.06 | 0.35 | 9.6 | 0.952 |
| 18 | HDPE HYA 600 | C6 | N/A | 1.87 | 30.9 | 0.954 |
| 19 | Paxon™ AL55-003 | C6 | N/A | 1.51 | 29.6 | 0.954 |
| 22 | Exceed XP 8318ML | C6 | 0.93 | N/A | 27.0 | 0.920 |
| 23 | Exceed XP 8656ML | C6 | 0.48 | N/A | 15.3 | 0.917 |
| 24 | Exceed XP 8656MK | C6 | 0.46 | N/A | 14.5 | 0.920 |
| 25 | Exceed XP 8358A | C6 | 0.50 | N/A | 15.2 | 0.920 |
| 26 | bis(npropylcyclo-pentadienyl) HfCl 2/MAO Catalyst Based Extruded Pellets | C6 | 4.37 | N/A | 75.9 | 0.937 |
| 27 | bis(npropylcyclo-pentadienyl) HfCl 2/MAO Catalyst Based Extruded Pellets | C6 | 4.54 | N/A | 78.4 | 0.937 |
| 28 | bis(npropylcyclo-pentadienyl) HfCl 2/MAO Catalyst Based Extruded Pellets | C6 | 71.70 | N/A | N/A | 0.955 |

*All data of Table 2B are for materials in pellet form.

Twin Screw Extrusion & Pelletization of Reactor Granules

Reactor granules were extruded on an 18 mm Baker Perkin co-rotating twin screw extruder (abbreviated thereafter as BP 18) with a hopper/feeder system manufactured in Canada by Brandbender Technologie Inc. The granules were fed into the extruder feed throat through a volumetric feeder (Brandbender Technologie Inc, Canada). The maximum achievable screw speed was 500 rpm and the maximum motor horsepower was 3 hp. Unless otherwise indicated, reactor granules were dry blended with 0.06% wt./wt.

temperature as shown in Tables 3A and 3B was measured in the bulk of the melt with an infrared sensor at a location between the end of the screw and the die. As can be seen in Tables 3A and 3B, the inventive examples show relatatively good extruder processability e.g. as shown by the SEI values and the ratio of die pressure over throughput as well as by the fact that the % torque for the inventive examples was well below 100% (100% is at the maximum allowed torque for the extruder before machine shut-down) under the conditions employed.

TABLE 3A

BP 18 twin screw extruder conditions for inventive and comparative examples

| Extruder Process Conditions | Inventive Example 1 | Inventive Example 2 | Inventive Example 3 | Comparative Example 4 | Comparative Example 5 | Comparative Example 6 |
|---|---|---|---|---|---|---|
| Feed Zone Temperature (° F.) | 290 | 287 | 289 | 283 | 285 | 281 |
| Zone 2 Temperature (° F.) | 375 | 375 | 374 | 370 | 372 | 369 |
| Zone 3 Temperature (° F.) | 402 | 409 | 393 | 404 | 393 | 397 |
| Zone 4 Temperature (° F.) | 405 | 405 | 398 | 398 | 399 | 400 |
| Zone 5 Temperature (° F.) | 404 | 401 | 402 | 398 | 400 | 397 |
| Zone 6 Temperature (° F.) | 429 | 419 | 425 | 414 | 424 | 422 |
| Die Temperature (° F.) | 420 | 416 | 419 | 414 | 415 | 414 |
| Melt Temperature (° F.) | 438 | 435 | 436 | 432 | 437 | 436 |
| Screw Speed (rpm) | 250 | 249 | 202 | 252 | 200 | 200 |
| Feeder Setting | 200 | 200 | 200 | 200 | 200 | 200 |
| Throughput (lbs/hr) | 6.0 | 5.7 | 5.7 | 5.1 | 6.6 | 6.3 |
| % Torque | 64 | 60 | 63 | 47.5 | 69 | 80 |
| Die Pressure (psi) | 799 | 698 | 710 | 499 | 735 | 910 |
| Pelletizer Setting | 30/3 | 30/3 | 30/3 | 30/3 | 30/3 | 30/3 |
| Pellet MI (dg/min), 190 C./5 kg | 0.7 | 1.0 | 1.1 | 1.2 | 0.5 | 1.0 |
| Pellet MI (dg/min), 190 C./21.6 kg | 11.1 | 15.3 | 15.6 | 26.1 | 15.6 | 9.1 |
| Pellet MIR = MI21.6/MI5 | 15.8 | 15.3 | 13.9 | 22.2 | 29.5 | 8.8 |
| Estimated Specific Energy Input (kw-hr/kg) | 0.259 | 0.255 | 0.217 | 0.228 | 0.203 | 0.247 |
| Die Pressure/Throughput (psi-hr/lb) | 133.1 | 122.5 | 124.6 | 97.7 | 111.4 | 144.4 |

TABLE 3B

BP 18 twin screw extruder conditions for inventive and comparative examples

| Extruder Process Conditions | Example 8 | Example 9 | Example 10 | Example 7 |
|---|---|---|---|---|
| Feed Zone Temperature (° F.) | 293 | 283 | 283 | 288 |
| Zone 2 Temperature (° F.) | 371 | 362 | 360 | 369 |
| Zone 3 Temperature (° F.) | 396 | 370 | 394 | 390 |
| Zone 4 Temperature (° F.) | 399 | 380 | 392 | 391 |
| Zone 5 Temperature (° F.) | 394 | 387 | 386 | 386 |
| Zone 6 Temperature (° F.) | 414 | 408 | 401 | 417 |
| Die Temperature (° F.) | 403 | 401 | 396 | 404 |
| Melt Temperature (° F.) | 422 | 425 | 413 | 419 |
| Screw Speed (rpm) | 252 | 150 | 252 | 252 |
| Feeder Setting | 200 | 200 | 200 | 200 |
| Throughput (lbs/hr) | 5.9 | 5.8 | 4.85 | 6.2 |
| % Torque | 64 | 72 | 47 | 73 |
| Die Pressure (psi) | 773 | 735 | 570 | 945 |
| Pelletizer Setting | 30/3 | 30/3 | 30/3 | 25/3 |
| Pellet MI (dg/min), 190 C./2 kg | 0.2 | 0.3 | 0.3 | N/A |
| Pellet MI (dg/min), 190 C./21.6 kg | 11.1 | 15.0 | 24.9 | 0.6 |
| Pellet MIR = MI21.6/MI2 | 59.1 | 53.1 | 97.9 | N/A |
| Estimated Specific Energy Input (kw-hr/kg) | 0.265 | 0.181 | 0.238 | 0.288 |
| Die Pressure/Throughput (psi-hr/lb) | 130.4 | 126.5 | 117.5 | 151.9 |

TABLE 4

List of molecular weight characteristics and % weight co-monomer content by GPC-4D

| Example | Mw (kg/mol) | Mz (kg/mol) | Mw/Mn | % weight Comonomer by GPC-4D* |
|---|---|---|---|---|
| 1 | 187.4 | 770.5 | 11.5 | 3.6 |
| 2 | 174.5 | 757.9 | 11.0 | 1.9 |
| 3 | 166.5 | 708.4 | 5.9 | 2.5 |
| 4 | 157.9 | 746.8 | 14.0 | 1.5 |
| 5 | 140.4 | 680.3 | 16.5 | 1.5 |
| 6 | 146.2 | 396.4 | 11.2 | 3.9 |
| 7 | 349.5 | 1049.9 | 18.0 | 0.0 |

TABLE 4-continued

List of molecular weight characteristics and % weight co-monomer content by GPC-4D

| Example | Mw (kg/mol) | Mz (kg/mol) | Mw/Mn | % weight Comonomer by GPC-4D* |
|---|---|---|---|---|
| 8 | 178.9 | 731.9 | 11.6 | 2.5 |
| 9 | 170.2 | 765.8 | 11.7 | 2.8 |
| 10 | 153.6 | 779.5 | 16.6 | 1.4 |
| 11 | 142.2 | 632.1 | 12.2 | 2.3 |
| 12 | 266.7 | 1147.9 | 16.4 | 3.2 |
| 13 | 348.9 | 2253.8 | 27.4 | 4.2 |
| 14 | 318.4 | 2067.9 | 32.7 | 3.8 |
| 15 | 248.0 | 1283.9 | 29.6 | 1.9 |
| 16 | 170.6 | 734.8 | 10.4 | 3.2 |
| 17 | 222.2 | 1168.9 | 19.5 | 4.1 |
| 18 | 129.0 | 573.0 | 10.7 | 2.8 |
| 19 | 124.1 | 532.7 | 7.3 | 3.4 |
| 20 | 178.3 | 579.9 | 10.4 | 16.3 |
| 21 | 129.7 | 525.9 | 7.0 | 8.8 |
| 22 | 123.7 | 311.2 | 4.1 | 9.6 |
| 23 | 145.0 | 379.7 | 4.3 | 8.9 |
| 24 | 149.6 | 376.7 | 4.2 | 9.5 |
| 25 | 145.6 | 384.9 | 4.1 | 8.2 |
| 26 | 77.1 | 161.8 | 3.3 | 3.8 |
| 27 | 76.9 | 158.3 | 3.2 | 3.4 |
| 28 | 35.5 | 73.9 | 3.2 | 1.9 |

*The % weight co-monomer was determined by GPC-4D according to Eq. (4) and the analysis described in the "Experimental" session.

TABLE 5

Co-monomer distribution ratios (CDR-1, w, CDR-2, w, CDR-3, w) and reversed-co-monomer indexes RCI, w and RCI, m

| Example ID | CDR-1, w | CDR-2, w | CDR-3, w | RCI, w (kg/mol) | RCI, m (kg/mol) |
|---|---|---|---|---|---|
| 1 | 3.15 | 4.71 | 3.36 | 4.74 | 168.3 |
| 2 | 3.36 | 4.82 | 3.31 | 3.31 | 114.7 |
| 3 | 2.73 | 3.50 | 2.44 | 2.47 | 86.9 |
| 4 | 1.03 | 1.47 | 1.46 | 0.82 | 41.7 |
| 5 | 1.02 | 1.18 | 1.17 | 0.27 | 9.3 |
| 6 | 1.08 | 1.08 | 1.07 | 0.26 | 8.8 |
| 7 | N/A | N/A | N/A | N/A | N/A |
| 8 | 2.73 | 3.89 | 2.93 | 6.11 | 217.4 |
| 9 | 3.60 | 3.79 | 2.97 | 4.08 | 143.9 |
| 10 | 0.98 | 1.21 | 0.97 | 0.63 | 31.6 |
| 11 | 0.96 | 1.06 | 1.00 | −0.49 | −24.7 |
| 12 | 1.45 | 1.07 | 0.87 | 1.02 | 34.7 |
| 13 | 1.12 | 1.05 | 0.98 | 2.81 | 98.4 |
| 14 | 1.42 | 1.42 | 1.11 | 4.15 | 214.9 |
| 15 | 0.93 | 1.12 | 1.19 | 2.16 | 109.9 |
| 16 | 1.12 | 1.19 | 0.83 | −0.93 | −31.4 |
| 17 | 0.20 | 0.47 | 0.76 | −1.01 | −34.6 |
| 18 | 0.69 | 0.76 | 0.99 | 0.01 | 0.3 |
| 19 | 1.54 | 1.64 | 1.33 | 0.49 | 16.8 |
| 20 | 2.20 | 4.08 | 3.35 | 34.93 | 1777.1 |
| 21 | 3.65 | 4.55 | 3.33 | 11.86 | 502.8 |
| 22 | 1.35 | 1.76 | 1.61 | 4.21 | 163.3 |
| 23 | 1.31 | 1.73 | 1.61 | 5.22 | 200.7 |
| 24 | 1.31 | 1.72 | 1.60 | 5.48 | 212.4 |
| 25 | 1.43 | 1.94 | 1.77 | 5.14 | 196.6 |
| 26 | 1.24 | 1.36 | 1.23 | 0.37 | 12.8 |
| 27 | 1.20 | 1.31 | 1.20 | 0.34 | 11.7 |
| 28 | 1.12 | 1.18 | 1.10 | 0.05 | 1.8 |

TABLE 5

Co-monomer distribution ratios (CDR-1, m, CDR-2, m, CDR-3, m)

| Example ID | CDR-1, m | CDR-2, m | CDR-3, m |
|---|---|---|---|
| 1 | 3.26 | 4.90 | 3.45 |
| 2 | 3.44 | 4.95 | 3.36 |
| 3 | 2.80 | 3.60 | 2.48 |
| 4 | 1.03 | 1.48 | 1.46 |
| 5 | 1.02 | 1.18 | 1.18 |
| 6 | 1.08 | 1.09 | 1.07 |
| 7 | N/A | N/A | N/A |
| 8 | 2.82 | 4.03 | 3.00 |
| 9 | 3.71 | 3.91 | 3.03 |
| 10 | 0.98 | 1.21 | 0.97 |
| 11 | 0.96 | 1.06 | 1.00 |
| 12 | 1.46 | 1.08 | 0.87 |
| 13 | 1.12 | 1.05 | 0.98 |
| 14 | 1.43 | 1.42 | 1.11 |
| 15 | 0.93 | 1.12 | 1.19 |
| 16 | 1.12 | 1.19 | 0.83 |
| 17 | 0.20 | 0.47 | 0.76 |
| 18 | 0.69 | 0.76 | 0.99 |
| 19 | 1.55 | 1.66 | 1.33 |
| 20 | 2.74 | 5.46 | 4.14 |
| 21 | 4.29 | 5.40 | 3.72 |
| 22 | 1.39 | 1.85 | 1.67 |
| 23 | 1.35 | 1.81 | 1.67 |
| 24 | 1.35 | 1.80 | 1.66 |
| 25 | 1.47 | 2.03 | 1.84 |
| 26 | 1.25 | 1.37 | 1.24 |
| 27 | 1.21 | 1.32 | 1.20 |
| 28 | 1.12 | 1.18 | 1.10 |

TABLE 6

List of slow crack growth resistance via ESCR (ASTM D1693) and NCSL (ASTM F2136)

| Example ID | Density (g/cm³) | ESCR (hrs.) @ 50% Failure (F50), 10% Igepal, 50° C., ASTM D1693 | NCLS (hrs.), 10% Igepal, 50° C., 800 psi, ASTM F2136 |
|---|---|---|---|
| 1 | 0.947 | >3864 (test stopped with no failure) | 79 |
| 2 | 0.950 | 1039 | 39 |
| 3 | 0.950 | 791 | 44 |
| 4 | 0.954 | 624 | 30 |
| 5 | 0.950 | 693 | 81 |
| 6 | 0.945 | >5400 (test stopped with no failure) | 339 |
| 7 | 0.952 | 126 | N/A |
| 8 | 0.947 | >5878 (test stopped with no failure) | N/A |
| 9 | 0.951 | 1434 | N/A |
| 10 | 0.954 | 501 | N/A |
| 11 | 0.957 | 137 | N/A |
| 16 | 0.949 | 150 | N/A |
| 17 | 0.952 | 298 | N/A |
| 18 | 0.954 | 32 | N/A |
| 19 | 0.954 | 24 | N/A |

TABLE 7

Crystallinity characteristics of inventive and comparative examples via X-ray scattering (WAXS/SAXS).

| Example ID | % Crystallinity WAXS | SAXS q1 (Å-1) | SAXS q2 (Å-1) | SAXS Lp1 (Å) | SAXS Lp2 (Å) | SAXS Lp1/Lp2 |
|---|---|---|---|---|---|---|
| 1 | 53.2 | 0.0245 | 0.0465 | 256.56 | 135.09 | 41.20 |
| 2 | 56.2 | 0.0244 | 0.0458 | 257.93 | 137.31 | 40.40 |
| 4 | 53.6 | 0.026 | 0.0498 | 242.03 | 126.17 | 39.00 |
| 5 | 53.8 | 0.02559 | 0.04685 | 245.53 | 134.11 | 33.20 |
| 6 | 51.6 | 0.0264 | 0.0488 | 238.18 | 128.70 | 45.80 |

TABLE 8

Rheological characteristics of representative inventive and comparative examples.

| Example | $\eta^*(0.01\ rad/s)/\eta^*(118\ rad/s)$ | SHR @ $0.01\ s^{-1}$ Hencky strain rate | SHR @ $0.1\ s^{-1}$ Hencky strain rate | Melt Strength @ 190° C. Die Temperature (cN) |
|---|---|---|---|---|
| 1 | 39.4 | 3.3 | 2.7 | 10.0 |
| 2 | 29.6 | 4.3 | 2.9 | 8.0 |
| 4 | 38.9 | 6.8 | 3.3 | 6.4 |
| 5 | 10.1 | 3.0 | 1.3 | 5.0 |
| 6 | 17.7 | 1.6 | 1.4 | 7.8 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

What is claimed is:

1. A process to produce ethylene copolymer comprising: i) contacting, in the gas phase or slurry phase, ethylene and one or more $C_3$ to $C_{20}$ comonomers, with a catalyst system comprising a reaction product of fluorided silica support, alkylalumoxane activator and at least two metallocene catalyst compounds, where the first metallocene catalyst compound is a bridged monocyclopentadienyl group 4 transition metal compound and the second metallocene catalyst compound is a biscyclopentadienyl group 4 transition metal compound where the fluorided silica support has not been calcined at a temperature of 400° C. or more; and ii) obtaining an ethylene polymer having:
   1) at least 50 mol % ethylene;
   2) a reversed comonomer index, mol %, (RCI,m) of 85 or more;
   3) a comonomer distribution ratio-2 (CDR-2,m) of the mole percent comonomer at the z average molecular weight divided by the mole percent comonomer at the weight average molecular weight plus the number average molecular weight divided by 2 ([% comonomer at Mz]/[% comonomer at ((Mw+Mn)/2)] as determined by gel permeation chromatography (GPC) of 2.3 or more; and
   4) a density of 0.91 g/cc or more.

2. The process of claim 1, wherein the first metallocene catalyst compound and the second metallocene catalyst compound are each represented by the formula:

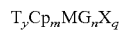

wherein each Cp is, independently, a cyclopentadienyl group which may be substituted or unsubstituted, M is a group 4 transition metal, G is a heteroatom group represented by the formula $JR^*_z$ where J is N, P, O or S, and R* is a linear branched or cyclic hydrocarbyl group having from one to twenty carbon atoms and z is 1 or 2, T is a bridging group, and y is 0 or 1, X is a leaving group, and m=1 or 2, n=0, 1, 2 or 3, q=0, 1, 2 or 3, and the sum of m+n+q is equal to the oxidation state of the transition metal; wherein m=1, n=1 and y=1 in the first metallocene catalyst compound; and n=0 and m=2 in the second metallocene catalyst compound.

3. The process of claim 2, wherein y is one in the second metallocene catalyst compound and at least one Cp in the second metallocene catalyst compound is not a substituted or unsubstituted indene group.

4. The process of claim 2, wherein each Cp is a cyclopentadiene, indene or fluorene, which may be substituted or unsubstituted, each M is titanium, zirconium, or hafnium, and each X is, independently, a halide, a hydride, an alkyl group, an alkenyl group or an arylalkyl group.

5. The process of claim 1, wherein the alkylalumoxane activator comprises an alkylalumoxane and a non-coordinating anion.

6. The process of claim 1, a molar ratio of the bridged monocyclopentadienyl group 4 transition metal compound to the biscyclopentadienyl group 4 transition metal compound is from 1:1 to 10:1 and the comonomer is $C_3$ to $C_{12}$ alpha olefin.

7. The process of claim 1, wherein for the bridged monocyclopentadienyl group 4 transition metal compound m is one, n is one, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

8. The process of claim 1, wherein the bridged monocyclopentadienyl transition metal compound comprises one or more of: $Me_2Si(Me_4Cp)(cyclododecylamido)TiMe_2$; $Me_2Si(Me_4Cp)(cyclododecylamido)TiCl_2$; $Me_2Si(Me_4Cp)(t\text{-}butylamido)TiMe_2$; $Me_2Si(Me_4Cp)(t\text{-}butylamido)TiCl_2$; $\mu\text{-}(CH_3)_2Si(Cp)(1\text{-}adamantylamido)M(R)_2$; $\mu\text{-}(CH_3)_2Si(3\text{-}t\text{-}BuCp)(1\text{-}adamantylamido)M(R)_2$; $\mu\text{-}(CH_3)_2Si(Me_4Cp)(1\text{-}adamantylamido)M(R)_2$; $\mu\text{-}(CH_3)_2C(Me_4Cp)(1\text{-}adamantylamido)M(R)_2$; $\mu\text{-}(CH_3)_2Si(Me_4Cp)(1\text{-}tertbutylamido)M(R)_2$; $\mu\text{-}(CH_3)_2Si(Flu)(1\text{-}tertbutylamido)M(R)_2$;

μ-(CH$_3$)$_2$Si(Me$_4$Cp)(1-cyclododecylamido)M(R)$_2$;
μ-(C$_6$H$_5$)$_2$C(Me$_4$Cp)(1-cyclododecylamido)M(R)$_2$;
μ-(CH$_3$)$_2$Si(η$^5$-2,6,6-trimethyl-1,5,6,7-tetrahydro-s-indacen-1-yl)(tertbutylamido)M(R)$_2$; where M is selected from a group consisting of Ti, Zr, and Hf and R is selected from halogen or C$_1$ to C$_5$ alkyl, Cp is cyclopentadienyl, Flu is fluorenyl.

9. The process of claim 1, wherein the second metallocene catalyst compound comprises one or more of: (THI)$_2$HfMe$_2$; (n BuCp)$_2$ZrCl$_2$, (Me$_2$Si)$_2$O(Ind)$_2$ZrCl$_2$; Me$_2$Si(3-(3-MeBu)Cp)(2,3,4,5-Me$_4$Cp)ZrCl$_2$; Me$_2$Si-(3-Ph-Ind)(Me$_4$Cp)ZrCl$_2$; Me$_2$Si(3-neopentylCp)(Me$_4$Cp)HfCl$_2$; tetramethyldisilylene bis(4-(3,5-di-t-BuPh)-indenyl)ZrCl$_2$; (Cp)(1,3-diPhCp)ZrCl$_2$; (Cp)$_2$ZrCl$_2$; (Me$_5$Cp)$_2$ZrCl$_2$; (Me$_5$Cp)$_2$ZrMe$_2$; (Me$_5$Cp)$_2$HfCl$_2$; (1 Me-3-n-BuCp)$_2$ZrCl$_2$; (1-Me-3-n-BuCp)$_2$ZrMe$_2$; (1-Me-3-n-BuCp)$_2$HfCl$_2$; (1-Me-3-n-BuCp)$_2$ZrMe$_2$; (Ind)$_2$ZrCl$_2$; (Ind)$_2$ZrMe$_2$; bis(tetrahydro-1-indenyl)ZrCl$_2$; bis(tetrahydro-1-indenyl)ZrMe$_2$; Me$_2$Si(THI)$_2$ZrCl$_2$; Me$_2$Si(THI)$_2$ZrMe$_2$; Me$_2$Si(Ind)$_2$ZrCl$_2$; Me$_2$Si(Ind)$_2$ZrMe$_2$; Me$_2$Si(Cp)$_2$ZrCl$_2$; and Me$_2$Si(Cp)$_2$ZrMe$_2$, where Cp is cyclopentadienyl, Ind is indenyl, Ph is phenyl, and THI is tetrahydroindenyl.

10. The process of claim 1, wherein the first and second metallocene catalyst compounds comprise one or more of:
SiMe$_2$(Me$_4$Cp)(cC$_{12}$N)TiMe$_2$ and bis(1-Bu,3-Me-Cp) ZrCl$_2$;
SiMe$_2$(Me$_4$Cp)(cC$_{12}$N)TiMe$_2$ and (SiMe$_2$) bis(indenyl) ZrCl$_2$;
SiMe$_2$(Me$_4$Cp)(cC$_{12}$N)TiMe$_2$ and (SiMe$_2$)$_2$Obis(indenyl) ZrCl$_2$;
SiMe$_2$(Me$_4$Cp)(cC$_{12}$N)TiMe$_2$ and (SiMe$_2$)$_2$O bis(indenyl)ZrMe$_2$;
SiMe$_2$(Me$_4$Cp)(cC$_{12}$N)TiMe$_2$ and SiMe$_2$(3-neopentylCp) ((Me$_4$Cp)HfCl$_2$;
SiMe$_2$(Me$_4$Cp)(cC$_{12}$N)TiMe$_2$ and SiMe$_2$(3-neopentylcyclopentadienyl)(Me$_4$Cp)HfMe$_2$;
SiMe$_2$(Me$_4$Cp)(1-adamantylamido)TiMe$_2$ and bis(1-Bu,3-MeCp)ZrCl$_2$; and
SiMe$_2$(Me$_4$Cp)(1-t-butylamido)TiMe$_2$ and bis(1-Bu,3-MeCp)ZrCl$_2$.

11. The process of claim 1, wherein the fluorided silica support has been calcined at a temperature of 100 to less than 400° C.

12. The process of claim 1, wherein the ethylene polymer has comonomer distribution ratio-1 (CDR-1,w) of the percent comonomer at the z average molecular weight divided by the percent comonomer at the weight average molecular weight (% comonomer Mz/% comonomer Mw) as determined by GPC of 2.0 or more.

13. The process of claim 1, wherein the ethylene polymer has a comonomer distribution ratio-3 (CDR-3,w) of the percent comonomer at the z average molecular weight plus the weight average molecular weight divided by 2 divided by the percent comonomer at the weight average molecular weight plus the number average molecular weight divided by 2 ([% comonomer at ((Mz+Mw)/2)]/[% comonomer at ((Mw+Mn)/2)] as determined by GPC of 2.2 or more.

14. The process of claim 1, wherein the process occurs at a temperature of from about 0° C. to about 300° C., at a pressure in a range of from about 0.35 MPa to about 10 MPa, and at a time up to 300 minutes.

15. The process of claim 1, wherein the one or more C$_3$ to C$_{20}$ comonomers are selected from propylene, butene, pentene, hexene, heptene, octene, nonene, decene, undecene, dodecene or mixtures thereof.

16. An ethylene polymer having: 1) a density of 0.910 g/cc or more, 2) an ethylene content of 50 mol % or more, based upon the weight of the polymer; 3) a reversed comonomer index, mol %, (RCI,m) of 85 or more; 4) a comonomer distribution ratio-2 (CDR-2,m) of the mole percent comonomer at the z average molecular weight divided by the mole percent comonomer at the weight average molecular weight plus the number average molecular weight divided by 2 ([% mole comonomer at Mz]/[% mole comonomer at ((Mw+Mn)/2)] as determined by gel permeation chromotography (GPC) of 2.3 or more.

17. The ethylene polymer of claim 16 having a density of 0.935 g/cc or more.

18. The ethylene polymer of claim 16 having
a) a RCI,m of 90 or more; and/or
b) a reversed comonomer index, molecular weight (RCI, w) of 2.2 or more; and/or
c) comonomer distribution ratio-1 (CDR-1,w) of the weight percent comonomer at the z average molecular weight divided by the weight percent comonomer at the weight average molecular weight (% comonomer Mz/% comonomer Mw) as determined by GPC of 2.0 or more, and/or
d) a comonomer distribution ratio-2 (CDR-2,w) of the weight percent comonomer at the z average molecular weight divided by the weight percent comonomer at the weight average molecular weight plus the number average molecular weight divided by 2 ([% comonomer at Mz]/[% comonomer at ((Mw+Mn)/2)] as determined by GPC of 2.2 or more; and/or
e) a comonomer distribution ratio-3 (CDR-3,w) of the weight percent comonomer at the z average molecular weight plus the weight average molecular weight divided by 2 divided by the weight percent comonomer at the weight average molecular weight plus the number average molecular weight divided by 2 ([% comonomer at ((Mz+Mw)/2)]/[% comonomer at ((Mw+Mn)/2)] as determined by GPC of 2.2 or more; and/or
f) an I2 of 0.01-10 g/10 min; and/or
g) an I5 of 0.05-50 g/10 min; and/or
h) an I21.6 of 0.1-100 g/10 min; and/or
i) a melt strength via Rheotens at 190° C. (die temperature) of greater than 7.5 cN; and/or
j) a shear thinning ratio via small angle oscillatory shear (SAOS) η*(0.01 rad/s)/η*(118 rad/s) greater than 20, where the viscosity ratio referring to 190° C. and η* is the complex viscosity; and/or
k) a strain hardening ratio (SHR) via Sentmanat extensional rheometer (SER) at 150° C. of at least 2.8 at a Hencky strain rate of 0.01 s$^{-1}$ and/or at least 2.5 at a Hencky strain rate of 1 s$^{-1}$; and/or
l) an environmental stress crack resistance, ESCR, (10% Igepal, 50° C., Condition B) of greater than 700 hours (F50) (on the average of 10 specimens).

19. The ethylene polymer of claim 17 where the polymer has an environmental stress crack resistance, ESCR, (10% Igepal, 50° C., Condition B) of greater than 1000 hours (F50) (on the average of 10 specimens).

20. The ethylene polymer of claim 17 where the polymer has a melt strength via Rheotens at 190° C. (die temperature) of greater than 7.5 cN.

21. The ethylene polymer of claim 16, wherein the polymer has a density of 0.938 g/cc or more, a comonomer distribution ratio-1 (CDR-1,w) of the weight percent comonomer at the z average molecular weight divided by the weight percent comonomer at the weight average molecular weight (% comonomer Mz/% comonomer Mw) as determined by GPC of 2.2 or more, a comonomer distribution ratio-2 (CDR-2,w) of the weight percent comonomer at the z average molecular weight divided by the weight percent comonomer at the weight average molecular weight plus the number average molecular weight divided by 2 ([% comonomer at Mz]/[% comonomer at ((Mw+Mn)/2)] as determined by GPC of 2.2 or more, and a comonomer distribution ratio-3 (CDR-3,w) of the weight percent comonomer at the z average molecular weight plus the weight average molecular weight divided by 2 divided by the weight percent comonomer at the weight average molecular weight plus the number average molecular weight divided by 2 ([% comonomer at ((Mz+Mw)/2)]/[% comonomer at ((Mw+Mn)/2)] as determined by GPC of 2.2 or more.

22. A blend comprising the ethylene polymer of claim 16 and a second ethylene polymer comprising a polymer of ethylene and optionally one or more $C_3$ to $C_{20}$ alpha olefins and having an $M_w$ of 20,000 to 1,000,000 g/mol and a density of 0.87 to 0.96 g/cm$^3$.

23. The blend of claim 22 wherein the second copolymer comprises at least 50 wt % ethylene and having up to 35 wt % of a $C_3$ to $C_{20}$ comonomer, based upon the weight of the copolymer and a composition distribution breadth index (CDBI) of 60% or more.

24. An article comprising the blend of claim 22 and has an environmental stress crack resistance (ESCR) of 700 hours or more.

25. The ethylene polymer of claim 17, having a crystallinity from 45% to 80% (measured by wide-angle X-ray scattering (WAXS)) and intercrystalline spacing Lp1 of over 250 Å (measured by small-angle X-ray scattering (SAXS)) and a ratio for primary to secondary crystal interlamellar spacing of at least 40.

\* \* \* \* \*